US012434470B2

(12) United States Patent
Landa

(10) Patent No.: US 12,434,470 B2
(45) Date of Patent: Oct. 7, 2025

(54) APPARATUS FOR PRINTING ON CYLINDRICAL OBJECTS HAVING DEVICE TO PREVENT LOADING OF OBJECTS ONTO MANDRELS

(71) Applicant: LANDA LABS (2012) LTD., Rehovot (IL)

(72) Inventor: Benzion Landa, Nes Ziona (IL)

(73) Assignee: LANDA LABS (2012) LTD., Rehovot (IL)

( * ) Notice: Subject to any disclaimer, the term of this patent is extended or adjusted under 35 U.S.C. 154(b) by 0 days.

(21) Appl. No.: 18/424,809

(22) Filed: Jan. 28, 2024

(65) Prior Publication Data

US 2024/0165944 A1 May 23, 2024

Related U.S. Application Data

(60) Division of application No. 18/053,428, filed on Nov. 8, 2022, now Pat. No. 11,926,144, which is a (Continued)

(30) Foreign Application Priority Data

Sep. 13, 2018 (GB) ...................................... 1814882
Jun. 3, 2019 (GB) ...................................... 1907890

(51) Int. Cl.
*B41F 17/22* (2006.01)
*B41F 1/16* (2006.01)
(Continued)

(52) U.S. Cl.
CPC ................ *B41F 17/22* (2013.01); *B41F 1/16* (2013.01); *B41F 13/0008* (2013.01);
(Continued)

(58) Field of Classification Search
None
See application file for complete search history.

(56) References Cited

U.S. PATENT DOCUMENTS 2,799,220 A * 7/1957 Oscroft ................... B41F 17/22 101/37
3,565,034 A * 2/1971 Birchall .................. B41F 17/22 118/262
(Continued)

FOREIGN PATENT DOCUMENTS

DE 10 2015 201341 7/2016
FR 2670759 6/1992
(Continued)

*Primary Examiner* — Leslie J Evanisko
(74) *Attorney, Agent, or Firm* — JMB Davis Ben-David

(57) ABSTRACT

An apparatus is disclosed for printing images on generally cylindrical objects. The apparatus comprises an impression station that includes a movable imaging surface for bearing an ink image; and a transport mechanism for advancing the objects through the impression station, comprising a drive member rotatably connected to a plurality of rotatable mandrels, each for mounting a respective one of the objects, the transport mechanism being configured to cause each object to rotate during passage through the impression station such that, within a nip region of the impression station, the surface of the object makes rolling contact with the imaging surface, thereby causing the ink image to be impressed on the object. An impression platen is provided opposite the imaging surface within the nip region, the impression platen being configured to apply a force, directly or indirectly, to the objects to ensure rolling contact between the objects and the imaging surface.

20 Claims, 10 Drawing Sheets

Related U.S. Application Data continuation of application No. 17/199,487, filed on Mar. 12, 2021, now Pat. No. 11,541,652, which is a continuation-in-part of application No. PCT/IB2019/057474, filed on Sep. 5, 2019.

(51) Int. Cl.

| | |
|---|---|
| ***B41F 13/00*** | (2006.01) |
| ***B41F 17/00*** | (2006.01) |
| ***B41J 3/407*** | (2006.01) |
| ***B41J 11/00*** | (2006.01) |

(52) U.S. Cl.

CPC ........... *B41F 17/006* (2013.01); *B41J 3/4073* (2013.01); *B41J 3/40733* (2020.08); *B41J 11/002* (2013.01); *B41J 11/00214* (2021.01)

(56) References Cited

U.S. PATENT DOCUMENTS

| | | | |
|---|---|---|---|
| 3,915,288 | A | 10/1975 | Szpitalak |
| 4,337,719 | A | 7/1982 | Vander Griendt et al. |
| 5,893,016 | A | 4/1999 | Landa et al. |
| 6,651,552 | B1 | 11/2003 | Didonato |
| 8,919,247 | B2 | 12/2014 | Morgavi et al. |
| 9,381,736 | B2 | 7/2016 | Landa et al. |
| 9,566,780 | B2 | 2/2017 | Landa et al. |
| 9,643,400 | B2 | 5/2017 | Landa et al. |
| 9,782,993 | B2 | 10/2017 | Landa et al. |
| 10,486,368 | B2 | 11/2019 | Allen et al. |
| 10,759,953 | B2 | 9/2020 | Landa et al. |
| 10,782,633 | B2 | 9/2020 | Landa |
| 10,782,634 | B2 | 9/2020 | Landa |
| 10,884,349 | B2 | 1/2021 | Landa et al. |
| 11,541,652 | B2 | 1/2023 | Landa |
| 2015/0025179 | A1 | 1/2015 | Landa et al. |
| 2020/0353746 | A1 | 11/2020 | Landa et al. |
| 2020/0371456 | A1 | 11/2020 | Landa |
| 2020/0371457 | A1 | 11/2020 | Landa |

FOREIGN PATENT DOCUMENTS

| | | |
|---|---|---|
| GB | 1409083 | 10/1975 |
| GB | 2192586 | 1/1988 |
| GB | 2512678 | 10/2014 |
| WO | 2015/036812 | 3/2015 |
| WO | 2017/208145 | 12/2017 |
| WO | 2017208246 | 12/2017 |
| WO | 2019060394 | 3/2019 |

* cited by examiner

Fig. 1 – Prior Art

APPARATUS FOR PRINTING ON CYLINDRICAL OBJECTS HAVING DEVICE TO PREVENT LOADING OF OBJECTS ONTO MANDRELS

CROSS-RELATED APPLICATIONS

This application is a Divisional of U.S. patent application Ser. No. 18/053,428, filed on Nov. 8, 2022, which is a Continuation of U.S. patent application Ser. No. 17/199,487, filed on Mar. 12, 2021, now issued as U.S. Pat. No. 11,541,652, which is a Continuation-in-Part (CIP) of International Application No. PCT/IB2019/057474, filed on Sep. 5, 2019, which claims priority to Great Britain Application Nos. GB 1814882.5, filed on Sep. 13, 2018, and GB 1907890.6, filed on Jun. 3, 2019. The entire disclosures of all the aforementioned applications are incorporated by reference herein for all purposes as if fully set forth herein.

FIELD

The present disclosure relates to printing on generally cylindrical objects. The term "generally cylindrical" is intended to refer to straight-sided three-dimensional objects, such as cans and tubes, having a uniform essentially circular or elliptical cross section.

BACKGROUND

In a wide variety of fields, it is desired to print an image onto the surface of generally cylindrical objects made of a variety of materials. Such processes are common in the packaging industry for a variety of containers from relatively rigid canisters made of metallic or plastics materials (such as food or beverage cans, aerosol cans, caulking paste tubes and the like) to relatively flexible containers (such as toothpaste tubes, yoghurt cups, margarine tubs, drinking glasses and the like), as well as for lids for such containers of solids or liquids.

In some cases, a cylindrical surface is produced by rolling and seam welding a flat sheet, and, in such cases, printing can be carried by conventional means on the surface while it is still flat. However, different printing techniques are required when the cylindrical surface is formed, for example, by deep drawing or extrusion and the ink image must be applied to a curved surface.

Printing systems are known for printing on cylindrical objects that are open at one end, such as cans that have yet to be closed and filled. The hollow objects may be passively fed to a printing apparatus by gravity or they may be mounted on mandrels of a system that advances the cans through an impression station. Typically, the mandrels rotate the cans around their longitudinal axis while ink is directly or indirectly deposited on their outer surface. In indirect offset printing systems, the rotating mandrels generally press the objects mounted thereon against an ink image bearing surface during their passage through the impression station to impress an ink image onto the cylindrical surface. To meet the needs of the industry, such systems are preferably high speed continuous decorating machines.

FIG. 1 of the accompanying drawings shows a known apparatus for printing on the surface of beverage cans. The apparatus of FIG. 1 is only one part of a processing plant concerned with the step of printing on cans after the objects are formed and before they are filled and capped. The cans 106 follow a path 12 to the printing apparatus 10, being guided by a conveying system that is omitted from the drawing in the interest of clarity.

The printing apparatus has a transport turret 14 that carries around its circumference a plurality of cantilevered mandrels 16 mounted in a planetary manner around a center of rotation, each mandrel being dimensioned to fit within a respective one of the cans. Each mandrel may be mechanically rotated through gears, pulleys and the like, or may be directly driven by a motor, such as a servo motor. The effect of the gearing or servo motor, not shown, is to cause each mandrel 16 to spin about its own axis at approximately the same surface velocity as the surface of circumferentially spaced blanket pads 20 while being transported counter-clockwise along a circular path by the transport turret 14. The transport turret 14 in this way brings each can sequentially to an impression station at a nip region 18 where it rotates and rolls against one of several circumferentially spaced blanket pads 20 that are carried on the outer surface of a clockwise rotating impression drum 24. The blanket pads 20 are ink bearing pads that, during rotation of the impression drum 24, pass beneath a plurality of print heads 22 sequentially depositing parts of the ink image.

Each print head 22 is controlled to apply ink of a respective color to a respective region of each blanket pad. Ink application in such apparatus is traditionally performed by conventional means known in the field of offset printing, for instance using plates such as employed for flexographic printing. Digitally controlled application of inks by ink jetting techniques are also known, so that print heads 22 may encompass any such device suitable for either "mechanical printing" or "digital printing". In this way, during a cycle of rotation of the impression drum 24, a multicolor ink image is built up on each blanket pad and at a nip region 18 of the impression station, the blanket pad 20 makes rolling contact with one of the cans 106 in order to impress the applied multicolor ink image onto its outer surface, the different colors typically residing in a registered manner in different regions of the blanket pad, so as to not unduly overlap.

The objects must be aligned with and conveyed to the blanket pads, so that the ink images can be transferred onto the surfaces of the objects in a controlled manner, which need not be detailed herein.

Such an apparatus may further comprise a pre-printing processing station 15 and/or a post-printing processing station 17, serving respectively to treat the cans before and after the impression station in any manner suitable and desirable for the particular printing process.

In the apparatus of FIG. 1, in order to enable the pads 20 to remain in contact with the cans 106 over the entire circumference of the cans, the mandrels 16 can move radially relative to the axis of the transport turret 14 as they pass through the nip region 18. However, such movement needs to be opposed by a force acting radially on the mandrels to maintain a pressure between the surfaces of the cans 106 and the blanket pads 20. The pressure between the can and the ink image at the nip region of the impression station is applied via the axis shaft of the mandrel, which is necessarily cantilevered, in order to enable the container to be mounted and dismounted without dismantling the mandrel. One disadvantage of such a system is that the transport turret 14, as well as the mandrels 16 and their axis shafts, must be very precise and extremely rigid in order to withstand the high pressure applied during transfer, without significant deflection. Such high precision and high rigidity imply that the transport turret 14 must be massive and, consequently, costly.

SUMMARY

The present disclosure seeks to provide an improved design of the transport and transfer mechanisms in a system for printing on a cylindrical surface that inter alia overcomes certain disadvantages, which will be discussed in greater detail below.

In accordance with a first aspect of the invention, there is provided an apparatus for printing images on generally cylindrical objects, comprising:

- an impression station that includes a movable imaging surface for bearing an ink image; and
- a transport mechanism for advancing the objects through the impression station, comprising a drive member to which a plurality of mandrels is rotatably connected, each mandrel for supporting a respective one of the objects, the transport mechanism being configured to cause each object to rotate during passage through the impression station such that, within a nip region of the impression station, the surface of the object makes rolling contact with the imaging surface, thereby causing the ink image on the imaging surface to be impressed on the surface of the object;

wherein (iii) a stationary impression platen is provided within the nip region of the impression station on the opposite side of the objects from the imaging surface, the impression platen being configured to apply a force, directly or by way of the mandrel, to the objects to ensure rolling contact between the objects and the imaging surface.

In some embodiments, the impression platen is configured to apply a force directly to each object, by making rolling contact with a region of the surface of each object diametrically opposite a line of contact between the object and the imaging surface.

In alternative embodiments, the impression platen may be configured to contact the transport mechanism, so as to urge the mandrels on which the objects are supported towards the imaging surface.

The transport turret 14 in the printing apparatus of FIG. 1, which serves as the drive member of the transport mechanism, suffers from the disadvantage that its design needs to be complex in order to allow for a force to be applied to resist radial displacement of the mandrels 16. In the present disclosure, the force required to urge the objects against the imaging surface is not provided by the mechanism advancing the objects through the impression station but by an impression platen, which is mounted opposite the imaging surface and does not move in the direction in which the objects are advanced. Instead, the impression platen may either be stationary or capable of movement against a biasing force only in a direction to vary its distance from the imaging surface.

In some embodiments, the mandrels carrying the objects that are advanced through the impression station are connected to one, or more, flexible endless drive member(s).

Because the drive member used to advance the mandrels through the impression station is not called upon to apply a force to urge the objects against the imaging surface, there is nothing to preclude the drive member from being a chain or a drive belt instead of a turret. This offers the advantage that the drive member may now form part of a conveyor transporting the objects through various other stations. Such stations may include a pre-treatment station, where, for example, a primer may be applied to the objects or a post-treatment, where, for example, a varnish may be applied to protect the ink image.

It has also been proposed to use as the imaging surface the continuous outer surface of an Intermediate Transfer Member (ITM) of an offset printing system in place of the individual blanket pads 20 of the impression drum 24 shown in FIG. 1. FIG. 2 of the accompanying drawings shows such a modification of the apparatus of FIG. 1, as previously disclosed in WO 2017/208145. The apparatus of FIG. 2 is generally similar to that of FIG. 1 and the same reference numerals are used to designate unchanged components. The essential difference is that ink is not deposited by print heads on the pads 20 of the drum 24. Instead, an Intermediate Transfer Member or ITM 30 at least as wide as the length of the object to be printed thereon passes between the impression drum 24 and the object bearing mandrels 16. The ITM 30 is a flexible endless blanket that can, in operation, circulate constantly. At an imaging station 32, inks of different colors are jetted onto an outer surface of the ITM 30 (e.g., onto a hydrophobic outer surface), the inks comprising dissolved polymer or fine polymeric particles in dispersion and a coloring agent (e.g., a pigment or a dye) in a liquid, preferably aqueous, carrier. In a drying station 34, the carrier is evaporated to leave behind on the surface of the ITM 30 an ink image which remains tacky at least until transferred to the container surface. The term "tacky" as used herein is not intended to mean that the ink image or its constituents are necessarily tacky to the touch, but only dry enough so as form the intended image while still being able to sufficiently adhere to the surface of an object when pressed against it in a transfer or impression station. While drying of a liquid ink is typically performed by applying heat to the jetted image, reduction of carrier contents can be achieved by any other suitable curing method and a drying station 34 may include any curing device (e.g., heating elements, UV-curing elements, etc.) capable of effecting suitable drying of the ink image prior to transfer.

While the ITM 30 passes through the nip region 18 where it contacts the object to be printed or decorated, the ink image transfers from the outer (e.g., hydrophobic) surface of the ITM 30 to the objects 106 carried by the mandrels 16, and the surface of the ITM can then optionally be cleaned or otherwise treated at a cleaning/treatment station 36 before returning to the imaging station 32 to commence a new cycle. The apparatus of FIG. 2 is designed to be a retrofit to that of FIG. 1, but in an apparatus specifically designed to use an ITM in place of individual blanket pads, one can dispense with the impression drum 24 and replace it by an alternative support for the ITM 30. In this case, the support surface may be moved, spring biased, or shaped to avoid the need for the mandrels to be radially retractable on the turret. To avoid unnecessarily prolonging the present description, reference is made to WO 2017/208145 wherein the apparatus of FIG. 2, and various variants, are described more fully.

In some embodiments of the present disclosure, the imaging surface upon which an ink image can be deposited is that of an endless ITM of an offset printing system.

The force acting to apply pressure at the nip may, in some embodiments, result from the tension in the ITM. A sufficient tension of the ITM in the region overlapping the impression platen can be maintained by a variety of techniques to be detailed hereinbelow. Alternatively, the inner surface of the ITM may rest on a support surface which resists the force applied by the impression platen via the objects or which applies a force to the inner surface, urging the ITM towards the impression platen. As used herein the term "support surface" encompasses any area of a solid or flexible body able to urge or maintain the ITM at a distance from the impression platen suited to ensure rolling contact of the objects passing therebetween.

The support surface may be that of a solid object contoured to match the surface of the impression platen. By "contoured to match", it is meant that the distance between the impression platen and the support surface corresponds to the width dimension of the objects as they roll through the nip region. For circular objects, the width dimension is the constant diameter of the objects, whereas for elliptical objects it is the dimension as measured along a line passing through the intersection point of the major and minor axes of the ellipse and the points of contact of the objects with the impression platen and the support surface, as they roll without sliding through the nip region.

In order to maintain rolling contact between the objects and the ITM, it is necessary for the speed of the drive member transporting the mandrels through the nip region to move at half the speed of the ITM.

While ITMs having a relatively short circumference can have a seamless outer surface, longer ITMs are generally formed from a blanket strip of which the ends are joined to one another at a seam to form of a continuous loop. An ITM, which is also sometimes termed a transfer belt, may include more than one seam, depending on the numbers of blanket strips being attached to obtain any desired length.

It is not desirable to use a region of the ITM bearing a seam for printing, if good results are to be achieved, as the seam imperfections may create image defects. Because the speed of the ITM is exactly related to the speed of the drive member of the mandrels, and because the separation of the mandrels is predetermined, it is possible, by appropriate selection of the total length of the ITM, to ensure that only the same predetermined regions of the ITM are used for printing. This enables any seam region of the ITM to be designated as a no-print area and printing defects can be avoided by preventing objects from being loaded onto mandrels at locations that would coincide in the nip region with seam regions of the ITM.

Other regions of the ITM may be designated no-print regions. For example, if the ITM develops a local defect during use, the apparatus may be programmed not to print in the region of the defect instead of replacing the entire ITM.

Because of the presence of no-print regions on the ITM, in some embodiments, the printing apparatus may comprise a skip-feed mechanism to prevent objects from passing through the nip region if they would coincide with a no-print region.

While it would be possible merely to avoid loading objects onto selected mandrels, it is preferable for the mandrels to be removably connected to their drive member, so that a mandrel may be entirely removed from any location on the drive member that is synchronized with a no-print region of the ITM. This removal of the mandrel from its shaft, or even the removal of the shaft itself, is advantageous in printing processes where the ITM is pre-treated with a material which may transfer to the mandrel surface. Removal of mandrels is, for example, desired if the ITM is chemically conditioned.

A mechanism that may be used for loading and unloading of objects onto the mandrels may comprise an endless conveyor on which cradles are mounted at the same pitch as the mandrels. The conveyor has a transfer run that extends parallel to the drive member carrying the mandrels and the conveyor is timed so that the cradles and the mandrels remain correctly aligned with one another over the entire length of the transfer run. Objects from a vertical stack are dropped individually into each cradle and a force is applied as the mandrels and cradles travel side by side to transfer the objects from the cradles to the mandrels.

As a printing apparatus is preferably adapted to print on a variety of generally cylindrical objects that may have different diameters, the shape of the cradles can be varied for each diameter and/or the conveyer can be lowered or heightened with respect to the drive member, ensuring that the longitudinal axis of the object on the cradle is aligned to be co-axial with the shaft of the mandrel. The force effecting the transfer of the objects from the cradles to the mandrels or back may be applied by a stationary ramp. Alternatively, or additionally, an air knife, or other source of air pressure, may act to push the cradled objects towards the mandrels and suction may be applied by the mandrels to pull the objects onto them. To this end, the mandrels may be hollow and connected to a source of negative pressure as they pass along the transfer run. A reversed air pressure can be applied for unloading the printed objects.

The force effecting the transfer of the objects from the cradles to the mandrels may be maintained once the object is mounted on the mandrel for the duration of the impression, serving then as a locking mechanism. For instance, suction of the object on a hollow mandrel may maintain the object in position with respect to the shaft of the mandrel, allowing it to rotate during its passage between the impression platen and the support surface (e.g., tensioned ITM or solid body). Alternative, or additional, mechanisms may be used to lock the object in position once mounted on the mandrel. By way of non-limiting examples, the locking mechanisms may include expansion rings or sleeves and for ferric objects may involve a magnet. Alternatively, the objects may be held in place on the mandrels during the image transfer process simply by a guard rail preventing them from sliding out of position.

In a loading mechanism of this design, a skip-feed may be achieved by operation of a gate located at the bottom of the stack from which objects are dropped onto the cradles. Such a gate is opened when an object is to be dropped onto a cradle of the conveyor and is then closed to await the arrival of the next cradle onto which an object is to be loaded. If a cradle is one aligned with a location on the drive member where no printing is to take place, then the gate is merely kept closed during the passage of that cradle.

It is possible to identify cradles where no printing is to take place merely by counting, as the pattern of no-print regions on the ITM will repeat cyclically. Thus, the gate may be operated to follow a preset program. Alternatively, if mandrels are removed from the drive member at locations where no printing is to take place, then the sensed absence of a mandrel may serve to generate a signal to close the gate.

The ink image can be deposited on the outer or imaging surface of the ITM by any suitable printing process whether digital or not. Printing processes that are commonly used to form an ink image directly on the end substrate (e.g., paper or plastic foils), may be adapted to apply the ink image instead on an ITM. Such printing processes may include lithography, flexography, gravure and screen printing, which are well suited to long runs of identical images. In such processes, the ink image can at least partially transfer to the outer surface of the objects, reapplication of an identical ink image (reinking) being performed substantially at the same location on the ITM in a subsequent cycle.

Advantageously, the ink image is deposited by digital printing processes, such as ink jetting, xerographic printing or other electrophotographic printing methods, more adapted for shorter runs of changing images. The ink image when digitally deposited on the imaging surface of the ITM could even allow customization of individual objects, if desired. In such processes, because images may differ from cycle to cycle, the ink image should preferably transfer substantially fully to the object. While partial transfer may be tolerated, such would impose a duty to sufficiently clean the imaging surface before returning the ITM to the imaging station for the following cycle.

After an ink image has been impressed onto the first half of an object, it will come into rolling contact with the impression platen. As the ink image at this stage may retain some of its tackiness, it is desirable to form the surface of the impression platen of a low surface energy material, to which the tacky ink will not adhere. Non-limiting examples of such low surface energy materials (e.g., having a surface energy of 50, 40, 30 or 20 millinewtons per meter (mN/m) or less) are silicone, fluorosilicone, ethylene-tetrafluoroethylene and polytetra-fluoroethylene (PTFE).

In some embodiments, the ITM passes in the nip region over a cylinder in rolling contact with the ITM and the impression platen is concave.

In alternative embodiments of the invention, the impression platen may be flat or convex.

If the impression platen is convex, the tension in the ITM may suffice to ensure rolling contact with the objects as they pass through the nip region. With metal and plastics objects, that have a smooth surface, and that may have been pre-treated to improve their bonding to the ink image, a relatively small force may suffice to permit transfer of the ink images from the ITM to the objects. If the ITM tension is insufficient, an additional force may be applied to the inner surface of the ITM by a sponge roller as it passed through the nip region.

If the impression platen is flat, the inner surface of the ITM may rest against a flat support surface. The support surface in such case may be made of, or coated with a low-friction material, such as PTFE (e.g., Teflon®).

To reduce friction between the ITM and the support surface, it is possible to use as a support surface a tensioned run of a belt that is driven at the same speed as the ITM. If desired, to avoid even small deflection of the ITM during passage through the nip region, a stationary body may be provided in contact with the opposite side of the run of the belt that contacts the ITM.

The drive member serving to transport the mandrels through the nip region may suitably be constructed as a belt, such as a toothed belt, or as a chain formed of links that are pivotably connected to one another.

In some embodiments, the flexible drive member carries through the impression station evenly spaced rotatable mandrels. Mandrels aligned to one another in the print direction on a same side of the drive member can be viewed as a "column" of mandrels. In some embodiments, the flexible drive member carries a single column of mandrel, for single-sided mounting of generally cylindrical objects. Alternatively, to avoid the weight of the mandrels applying a torque to the drive member about an axis parallel to its direction of movement, it is desirable to dispose the mandrels symmetrically on opposite sides of the drive member. In this case, the mandrels are rotatably coupled to the flexible drive member as two parallel columns of mandrels, pairs of two mandrels in the adjacent columns of a common drive member being typically aligned with one another along their longitudinal axis. Mandrels aligned "side-by-side" to one another on each side of the drive member in the direction traverse to the print direction can be viewed as a "row" of mandrels.

As mentioned, it may be advantageous to be able to easily remove rows of mandrels to avoid no-print regions. The ability to easily modify the sequence of the mandrels on the drive member is advantageous in additional circumstances, for instance when the size and/or shape of the objects to be printed upon is changed from one print job to another. Such adaptability of the drive member may preclude the need to hold a variety of drive members each adapted for a different type (size and shape) of objects.

In some embodiments, the mandrel is attached to the drive member via an independent mandrel shaft. The mandrel shaft is rotatably attached to the drive member and the mandrel body (hollow or not) is fixedly attached to its shaft. Preferably, the mandrel shafts may be capable of supporting a number of different mandrel bodies, allowing printing on at least the same number of different objects mountable on each of the mandrel bodies.

While the pitch between mandrels can be modified according to the diameter of the objects to be mounted thereon, the pitch should correspond to at least about half the circumference of the object. The drive member can alternatively be suited for printing on the largest objects available at a decorating plan, in which case the replacement of the mandrel body with smaller mandrels without reducing the maximal pitch only increases the non-image gaps between the ink images on the ITM.

If the drive member is in the form of a chain, it is desirable for the axle of each mandrel to be aligned with one of the pivot pins connecting two links of the chain. In this way, even in the case of very small diameter mandrels, a single impression platen can be employed for each pair of mandrels without the chain interfering with the impression platen.

As an ITM may be considerably wider than the axial length of the objects (e.g., at least twice, at least three-times, or at least four-times the axial length of the object), it is possible for several drive members each carrying single-side columns of mandrels/objects or side-by-side pairs of objects to interact at the same time with a common ITM. For instance, the transport mechanism may consist of a) one drive member carrying two columns of mandrels side-by-side, or two drive members each carrying to the impression station a single column of mandrels, hence allowing concomitant printing on a row of mandrels mounted by two generally cylindrical objects; b) two drive members each carrying two column of mandrels side-by-side, hence allowing printing on four objects at a time in a row; or c) two drive members one carrying a single column of mandrels, the other supporting two such columns, hence allowing synchronous printing on three objects in a row of mandrels, and so on. Alternatively, several drive members may interact with the same ITM at stations staggered along the direction of travel of the ITM.

The number of flexible drive members in a transport mechanism, as well as the number of columns of mandrels each such drive would support, depends on the width of the imaging surface and the length of each cylindrical object to be mounted.

According to a second aspect of the invention, there is provided a method of printing on the outer surfaces of generally cylindrical objects, which method comprises:

(a) mounting each object on a respective mandrel rotatable about an axis,
(b) advancing the objects while mounted on the mandrels through an impression station that includes an imaging surface bearing an ink image, and
(c) rotating each object about the axis of its respective mandrel during passage through the impression station while urging the object against the imaging surface, such that the surface of the object makes rolling contact with the imaging surface, thereby causing the ink image to be impressed on the surface of the object, wherein (d) the object is urged into rolling contact with the imaging surface during passage through the impression station by an impression platen provided opposite the imaging surface within the nip region of the impression station on the opposite side of the objects from the imaging surface, which impression platen is configured to apply a force, directly or by way of the mandrels, to the objects, to ensure rolling contact between the objects and the imaging surface, and being stationary in the direction of movement of the imaging surface.

In some embodiments of the printing method, the force is directly applied to each object by the impression platen, by making rolling contact with a region of the surface of each object diametrically opposite a line of contact between the object and the imaging surface.

In alternative embodiments of the printing method, the force is indirectly applied to each object by the impression platen, the impression platen alternatively contacting the transport mechanism so as to urge the mandrels supporting the objects towards the imaging surface.

According to a further aspect of the invention, there is provided an apparatus for printing on three-dimensional objects, having a printing station and a conveyor for transporting objects through the printing station, wherein the conveyor comprises mandrels connected to an endless drive member, a loading station at which objects are mounted onto the mandrels prior to passage through the printing station and an unloading station for removing the objects from the mandrels after passage through the printing station, wherein operation of the printing station is capable of temporary interruption and the endless drive member of the conveyor is configured to operate continuously, including times when the printing station is inoperative, and wherein the loading station includes a device for inhibiting loading of objects onto mandrels that will pass through the printing station at times when the printing station is inoperative.

In one embodiment, the mandrels are rotatably connected to an endless drive member of the conveyor for transporting the three-dimensional objects to be mounted thereon.

BRIEF DESCRIPTION OF THE DRAWINGS

Some embodiments of the disclosure will now be described further, by way of example, with reference to the accompanying figures, where like reference numerals or characters indicate corresponding or like components. The description, together with the figures, makes apparent to a person having ordinary skill in the art how some embodiments of the disclosure may be practiced. The figures are for the purpose of illustrative discussion and no attempt is made to show structural details of an embodiment in more detail than is necessary for a fundamental understanding of the disclosure. For the sake of clarity and convenience of presentation, some objects depicted in the figures are not necessarily shown to scale.

In the Figures.

DETAILED DESCRIPTION

Nip Regions, ITM Support Surfaces and Impression Platens

Figure 3:
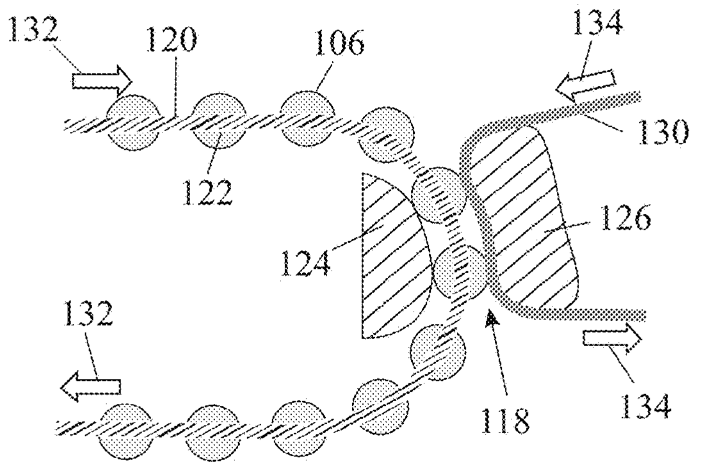
FIGS. 3 to 8, show the nip region of six different embodiments of a printing apparatus of the invention for printing on generally cylindrical objects.

FIG. 3 shows a flexible drive member (e.g., a chain or belt conveyor) 120 to which mandrels 122 are rotatably connected, the mandrels 122 serving to support and transport hollow cylindrical objects 106, such as the bodies of beverage cans before they are filled and capped. The objects 106 are transported by the drive member 120 through a nip region 118 defined between a stationary impression platen 124 and a support surface of a stationary block 126, such as a stationary anvil. The objects 106 pass through the nip region 118 in the direction of the arrows 132 while at the same time an ITM 130 of an offset printing system passes at twice the speed of the drive member through the same nip region in the direction of the arrows 134.

Figure 1:
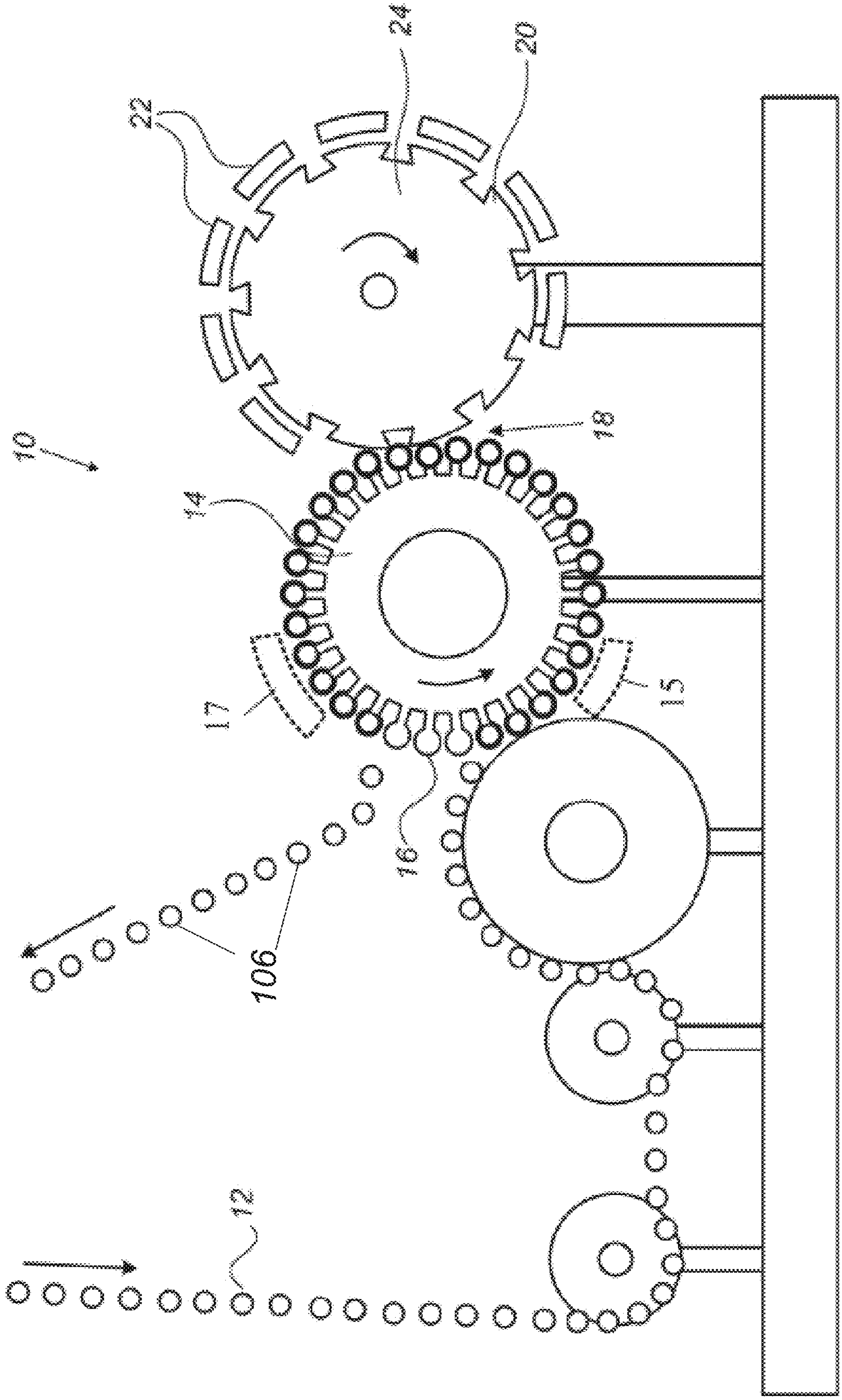
FIGS. 1 and 2 are, as earlier described, schematic representations of two known apparatuses that are disclosed and described in WO2017/208145.
Figure 2:
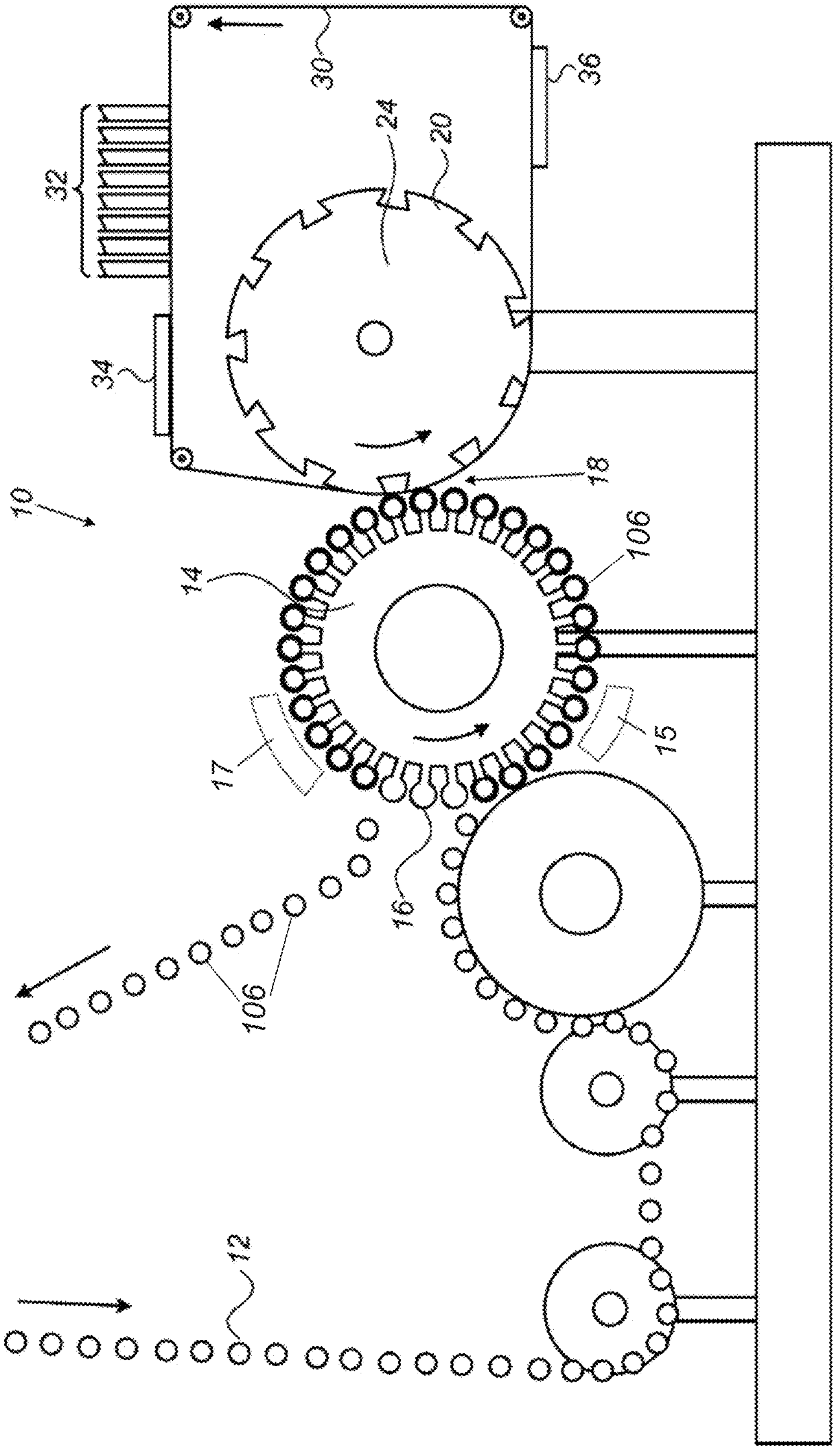
Fig. 2 Prior art

As in the apparatus shown in FIG. 2, outside the nip region shown in FIG. 3, the drive member 120 transports the objects through other stations of a processing plant. Likewise, outside the detail shown in FIG. 3, the ITM 130 passes through an imaging station, a drying station and an optional cleaning or treatment station in the same manner as the ITM 30 in the apparatus of FIG. 2, these stations being respectively illustrated therein by 32, 34 and 36. Methods of registering colors to yield a desired ink image of sufficient quality at an imaging station and of aligning an object with the ink image to be printed upon in a nip region are generally known and shall not be further detailed herein.

The contact between the objects 106 and the impression platen 124 causes the objects and their mandrels to rotate such that the objects 106 make rolling contact with the impression platen 124. For rolling contact between the objects 106 and the stationary platen 124, contact with the platen imparts an angular acceleration to the objects, causing them to spin with an angular velocity co, which is such that ω,r=v, where r is the radius of the objects and v is equal to the velocity of drive member 120. For the opposite side of the objects 106 to make rolling contact with the ITM 130, the latter must move with a velocity ω,r+v, that is to say at twice the speed of the drive member 120.

As the drive member 120 is flexible in the plane of FIG. 3 in a direction perpendicular to its direction of movement, it may not apply enough force to the objects 106 as they pass through the nip region 118 to ensure that the tacky ink image carried by the ITM 130 will transfer reliably to the objects. Instead, in the depicted embodiment, the objects are urged against the ITM 130 by the stationary impression platen 124 which is positioned and shaped to apply the necessary force as the objects roll through the nip region 118, while they constantly maintain rolling contact with both the impression platen 124 and the ITM 130. Either the impression platen 124 or the stationary support surface 126 may be comprised of a compressible material or may be spring loaded or otherwise urged towards one another in order to provide the pressure required to ensure continuous rolling contact during the transfer process. In this embodiment, the support surface 126 of the ITM is concave in the nip region and the impression platen 124 needs therefore to be convex in the same region. While in FIG. 3, the support surface is depicted as a solid body, alternative ways of providing a concave support surface to a convex impression platen shall be described in connection with FIGS. 7 and 8.

After the objects have rotated within the nip region through 180°, ink will reside on the surface of the objects in contact with the impression platen 124 and, as the ink may still be tacky, it is desirable for the impression platen 124 to have a low surface energy surface to which the ink will not adhere. Non-limiting examples of such low surface energy materials are silicone, fluorosilicone, ethylene-tetrafluoroethylene and poly-tetrafluoroethylene.

In the embodiment of FIG. 3, there is friction between the rear side of the ITM 130 and the stationary block 126 creating undesirable drag. While one can mitigate this problem by forming the surface of the block 126 of a low friction material, it is undesirable for the rear surface of the ITM 130 to have low friction properties as slipping of the ITM would interfere with correct synchronization with the movement of the drive member 120. It is therefore desirable, in some embodiments, to either lubricate the rear surface of the stationary block 126 or to otherwise provide low drag rolling or sliding support.

Figure 4:
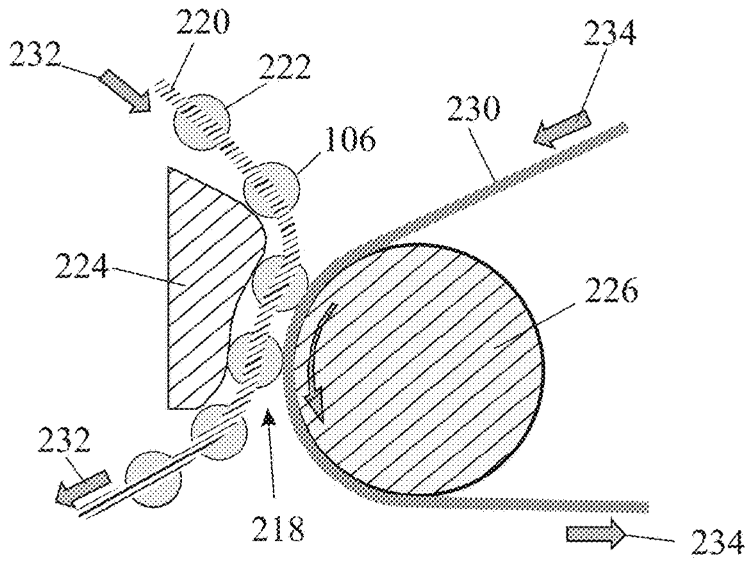

The embodiments of FIGS. 4 to 8 are generally similar to that of FIG. 3 and to avoid repetition, components serving the same function have been allocated reference numerals with the same two last significant digits. In the embodiment of FIG. 4, the surface supporting the ITM 230 on its side facing away from the impression platen 224 is that of one of the rotating impression rollers 226 that guide or drive the ITM 230. This avoids sliding friction between the ITM 230 and its support surface. In this embodiment, the support surface of the ITM is convex and the impression platen 224 needs therefore to be concave. The support surface is part of a non-stationary support block. In FIG. 4, the nip region is indicated by 218, the drive member is depicted as 220, the mandrels are illustrated by 222, and the arrows 232 indicate the direction followed by the objects mounted on the mandrels, whereas the arrows 234 indicate the direction followed by the ITM.

Figure 5:
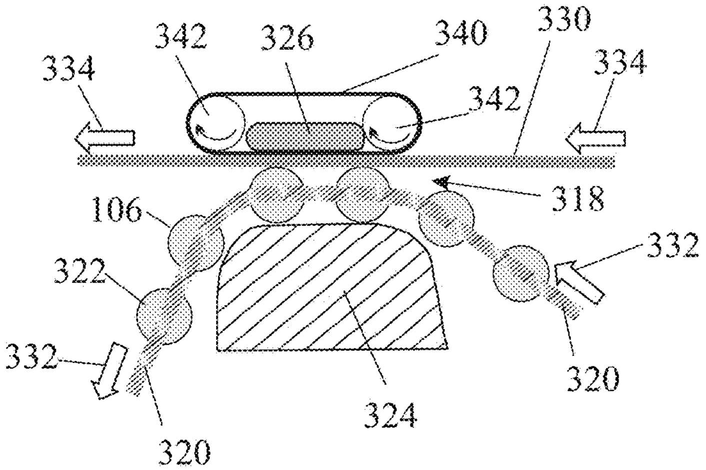

In the embodiment of FIG. 5, both the stationary support block 326 and the impression platen 324 are flat in the nip region 318. To eliminate frictional drag between the ITM 330 and the surface of the stationary block 326, a further endless belt 340, passing over rollers 342, surrounds the stationary block 326. The belt 340, in some embodiments, is driven independently (e.g., by at least one of roller 342) at the same speed as the ITM 330. In alternative embodiments, the belt may be driven by its frictional contact with the ITM 330 and it may have a low friction rear surface to slide over the flat stationary block 326, which too may have a low friction surface, and, if necessary, a lubricant may be used to reduce the frictional drag further. In FIG. 5, the drive member is depicted as 320, the mandrels are illustrated by 322, the arrows 332 indicate the direction followed by the objects mounted on the mandrels, and the arrows 334 indicate the direction followed by the ITM.

The embodiments shown in FIGS. 3, 4 and 5 are designed for printing on cylindrical objects of circular section. To print on objects of elliptical section, the contour of the impression platen may be adapted so that instead of the width of the nip region being constant over its entire length, it would vary between the widths of the object as measured along its major and minor axes. Alternatively, the impression platen may be spring biased so as to retract when the major axis of an object lies within the nip region, while still applying adequate pressure at the nip to ensure efficient transfer of the ink image.

It will be noted in all six of the embodiments shown in FIGS. 3-8, that the impression platen is shaped and sized to make contact with the objects before they reach the nip region within which they are urged against the ITM. This is to ensure that the objects and their mandrels commence to rotate with the correct angular velocity to match the speed of the ITM, before they contact the latter, thereby avoiding the risk of smearing of the ink images and avoiding unnecessary abrasion of the ITM. The impression region may, in some embodiments, accommodate more than one object at a time, the number of objects engaged in the nip depending on the relative dimension of the nip, the circumference of the objects and the spacing between subsequent objects.

Figure 6:
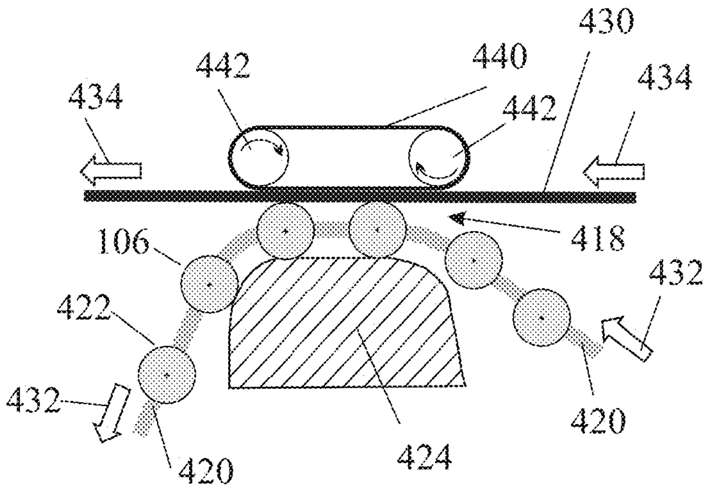

The embodiment of FIG. 6 is the same as that of FIG. 5 save that the stationary block 326 has been omitted. In this case, the tension in the belt 440 is relied upon to support the inner surface of the ITM 430. In FIG. 6, the nip region is indicated by 418, the drive member is depicted as 420, the mandrels are illustrated by 422, the impression platen is shown as 424, and the arrows 432 indicate the direction followed by the objects mounted on the mandrels, whereas the arrows 434 indicate the direction followed by the ITM. The endless belt 440 is shown circulating over rollers 442.

Figure 7:
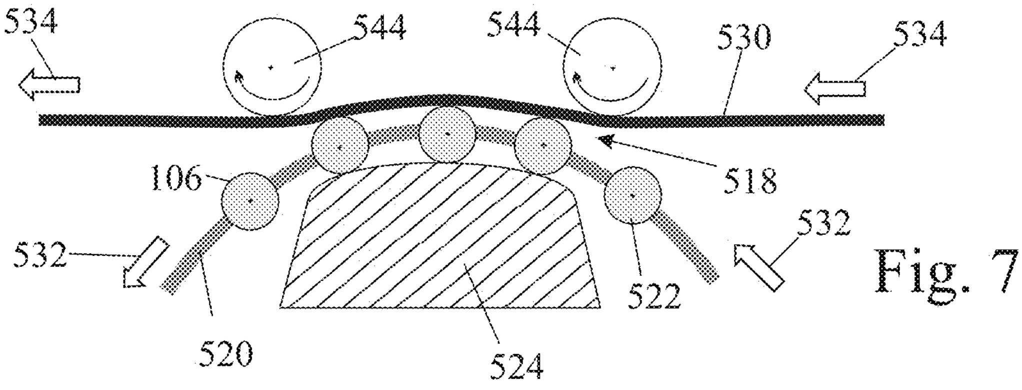

In the embodiment of FIG. 7, the inner surface of the ITM 530 is unsupported and instead reliance is placed on the tension in the ITM 530 itself. The impression platen 524 in this embodiment is convex and rollers 544 located one at each end of the nip region 518 deflect the ITM 530 to maintain it in rolling contact with the objects 106 over the length of the nip region 518. In FIG. 7, the drive member is depicted as 520, the mandrels are illustrated by 522, the arrows 532 indicate the direction followed by the objects mounted on the mandrels, and the arrows 534 indicate the direction followed by the ITM.

Figure 8:
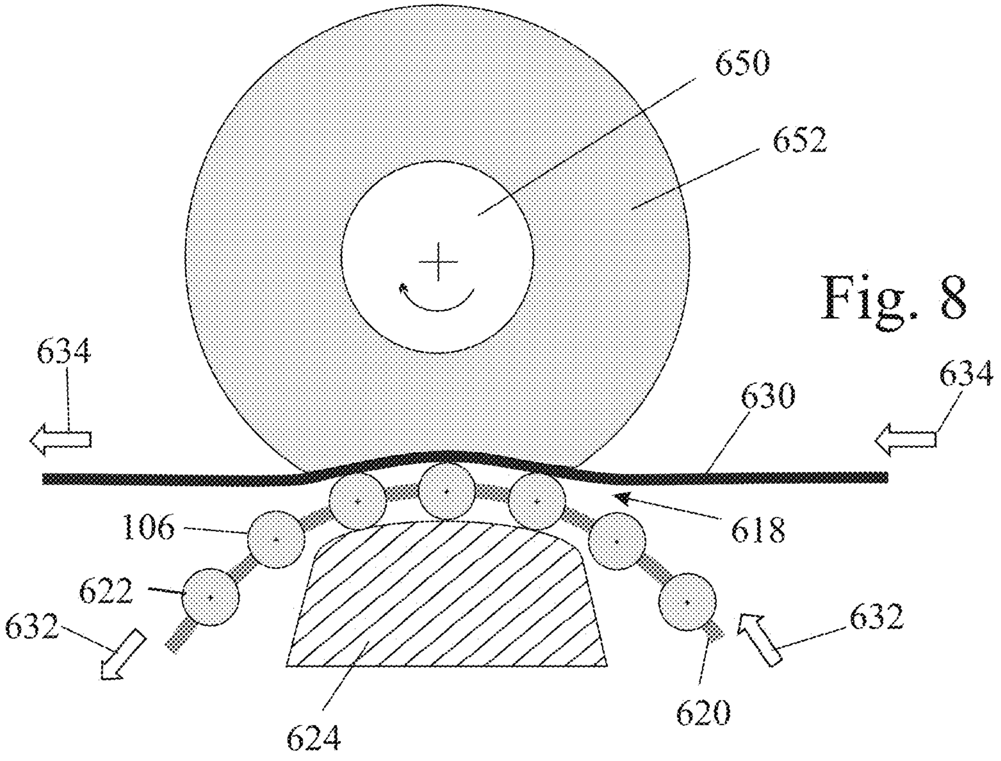

The embodiment of FIG. 8 differs from that of FIG. 7 in that the rollers 544 are omitted and replaced by a roller 650 having a sponge outer surface 652 in rolling contact with the ITM 630 and presses the ITM 630 against the objects 106 as they pass through the nip region 618. In FIG. 8, the drive member is depicted as 620, the mandrels are illustrated by 622, the impression platen is shown as 624, the arrows 632 indicate the direction followed by the objects mounted on the mandrels, and the arrows 634 indicate the direction followed by the ITM.

Mandrels Drive Members

Figures 9, 10, 11:
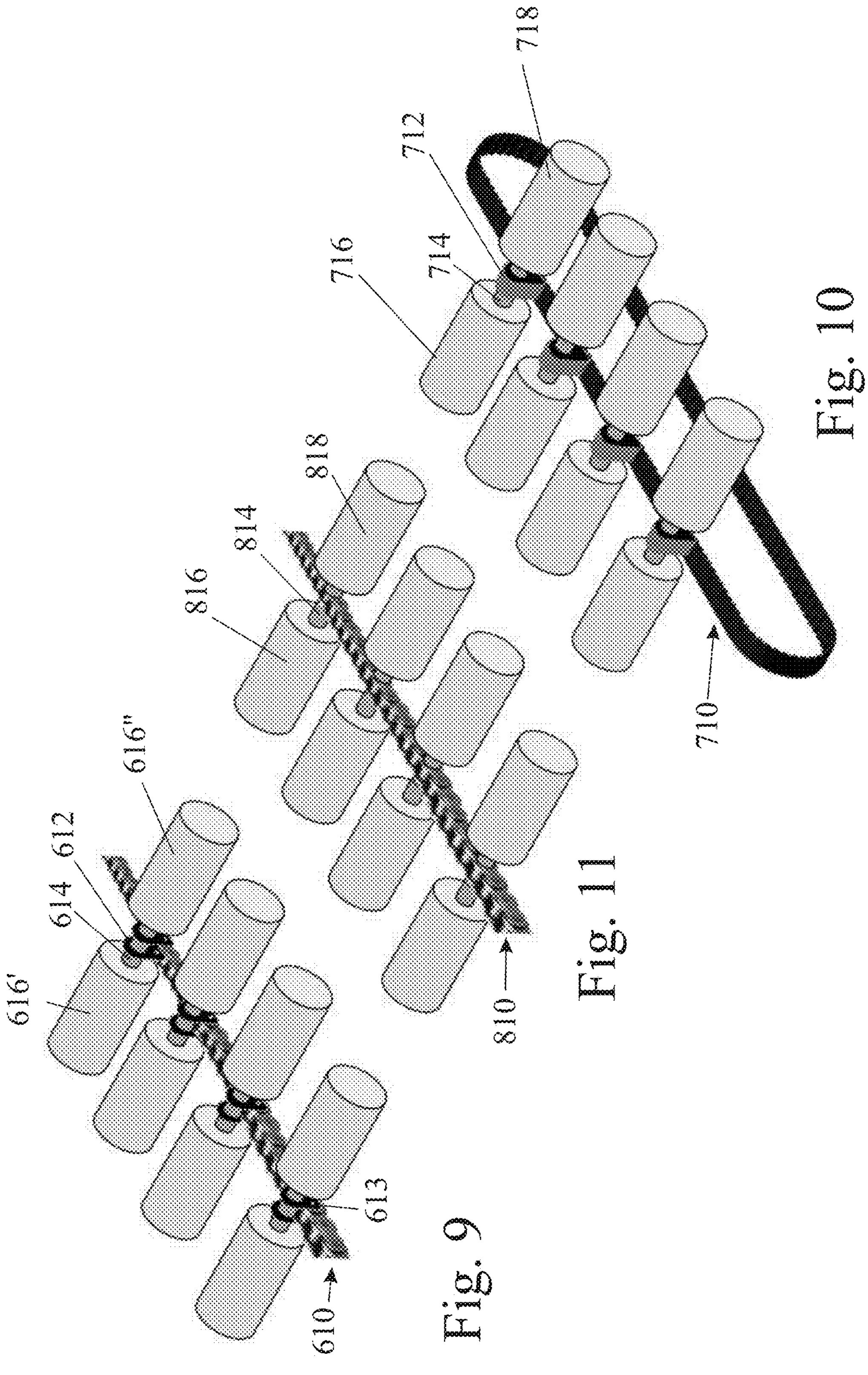
FIGS. 9, 10 and 11 show the drive members of three different embodiments of a printing apparatus of the invention for printing on generally cylindrical objects.

FIGS. 9 to 11 show perspective views of different conveyors that can serve as the drive members 120, 220 and 320 etc. in the embodiments shown in FIGS. 3-8. In FIG. 9, the drive member is a chain 610. At regular intervals along the length of the chain, saddles 612 are secured to the chain. Each saddle 612 is secured to the chain by two pins 613 that serve as pivots between the individual links of the chain 610. Each saddle 612 supports an axle 614 that carries, in the non-limiting exemplary illustration, two mandrels 616', 616" located one on each side of the chain 610.

FIG. 10 is generally similar to FIG. 9 save that a belt 710, which can be plain or toothed, is used in place of a chain, and saddles 712 are integrally formed with the belt 710 or are bonded to it. Once again, each saddle 712 supports an axle 714 that carries two mandrels 716, 718 located one on each side of the belt 710.

In the embodiment of FIG. 11, the drive member is once again a chain 810 but no saddle is used to mount each pair of mandrels 816, 818. Instead, the axle 814 of each pair of mandrels is part of a pivot pin connecting adjacent links of the chain. One or two such pins may be employed to secure each axle.

The embodiments shown in FIGS. 9, 10 and 11 are designed for printing on cylindrical objects of circular section. To print on objects of elliptical section, the shape of the mandrel may be adapted so as to better fit the shape of the object to be mounted thereon.

Skip-Feed Mechanism

As mentioned, an ITM suitable for transferring ink images to the outer surfaces of generally cylindrical objects according to the present teachings can be formed of one or more elongated blanket strips. The ends of the strip can be attached to one another by soldering, gluing, taping (e.g., using silicone adhesive strips, Kapton® tape, RTV liquid adhesives or PTFE thermoplastic adhesives with a connective strip overlapping both edges of the strip), or any other method commonly known. Any method of joining the ends of the blanket strip to form a transfer belt may cause a discontinuity, referred to herein as a seam.

The seam can be of different types. In particular, the edges may overlap one another or a patch may be applied to overlie the two ends. In either case, the seam may be subsequently processed, such as by grinding, to reduce its thickness to obtain an ITM having substantially the same thickness along the entire loop. Still the presence of one or more seams in an ITM may affect the print quality of an ink image which may span them. Therefore, in some embodiments, the printing process can be adapted to avoid applying an ink image in an area of the ITM including a seam. The feeding of the objects being printed upon needs to be accordingly discontinued, so that objects are transported through the impression station only synchronously with actual presence of ink images on the image bearing surface. An exemplary method (and device) to achieve this effect, referred to herein as "skip-feed", will now be described by reference to FIGS. 12 to 17.

Figure 12:
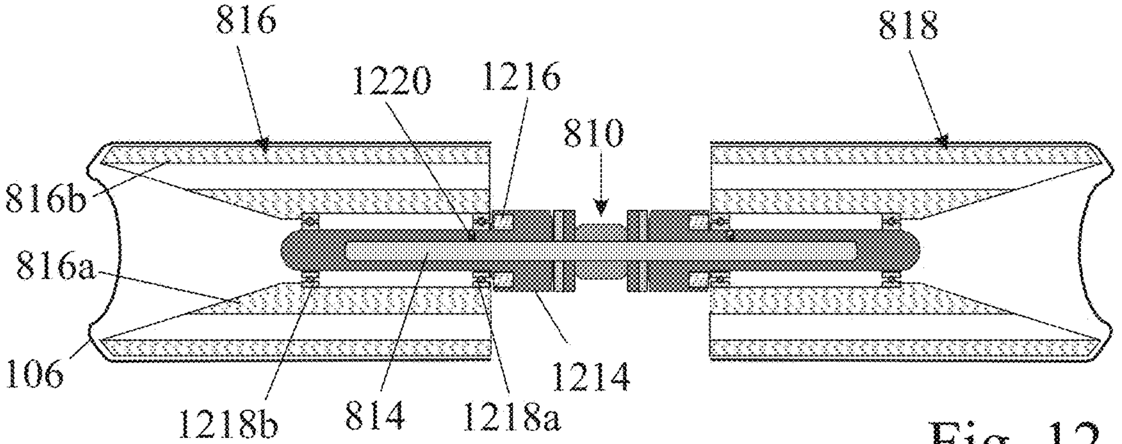
FIG. 12 is a section through two mandrels supported on a common shaft that also serves as the pivot between two links of a drive member in the form of a chain.
Figure 13:
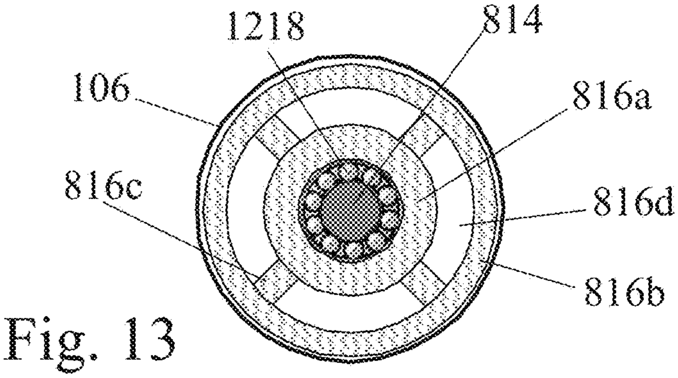
FIG. 13 is a section through one of the mandrels in FIG. 12 in a plane normal to the axis of the common shaft.

FIG. 12 shows a section through the drive member 810 of FIG. 11, the section plane passing through the axis of the shaft 814. The shaft 814, which acts as a pivot between two links of the chain 810, projects symmetrically from each side of the chain. On each side of the chain 810, a hub 1214 is secured to the shaft 814. The end of the hub 1214 remote from the chain 810 incorporates a magnet 1216. Each mandrel is hollow and, as shown in the section of FIG. 13 in respect of the mandrel 816, comprises an inner tube **816*a* connected to an outer cylinder 816*b* by radial webs or posts 816*c*. A space 816*d* between the inner tube 816*a* and the outer cylinder 816*b* serves as an air duct. The inner tube 816*a* is mounted for rotation about the shaft 814 by means of bearings 1218*a*, 1218*b* located one at each end of the inner tube 816*a*, only one series of bearings 1218 being visible in the view of FIG. 13**.

Each mandrel 816, 818 is fitted to the shaft 814 so that it can be pulled on and off simply and yet retained securely when in position. Retention of each mandrel is achieved by the magnet 1216 and/or by a spring-biased detent 1220 located in the shaft 814 adjacent the bearing **1218*a* proximal to the drive member. Such mounting allows the mandrels 816, 818** to be easily and quickly replaced by smaller ones when printing on smaller objects and enables individual mandrels to be removed when they synchronize with a no-print region of the ITM.

While a magnet has been proposed in the above with reference to FIG. 12, this should not be construed as limiting and any other structure allowing to easily attach, detach or replace the mandrels on the shafts can be suitable (e.g., quick release lock pins and the like). Moreover, the same principles, of having the drive members carrying mandrel shafts to which particular mandrels can be easily attached and securely retained when desired, apply when the drive member is in accordance with any other embodiments according to the present teachings, such as illustrated in FIGS. 9 and 10.

Figure 14:
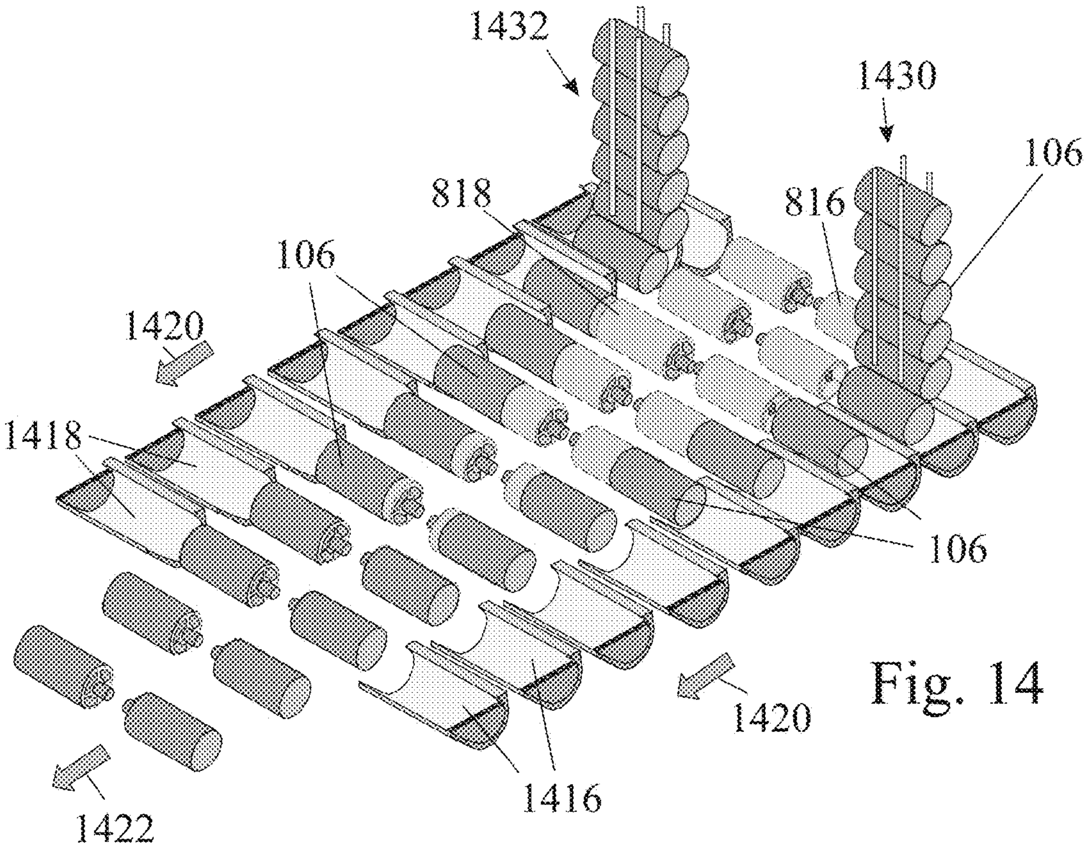
FIG. 14 is a perspective view of a loading station at which objects are loaded onto the mandrels.
Figure 15:
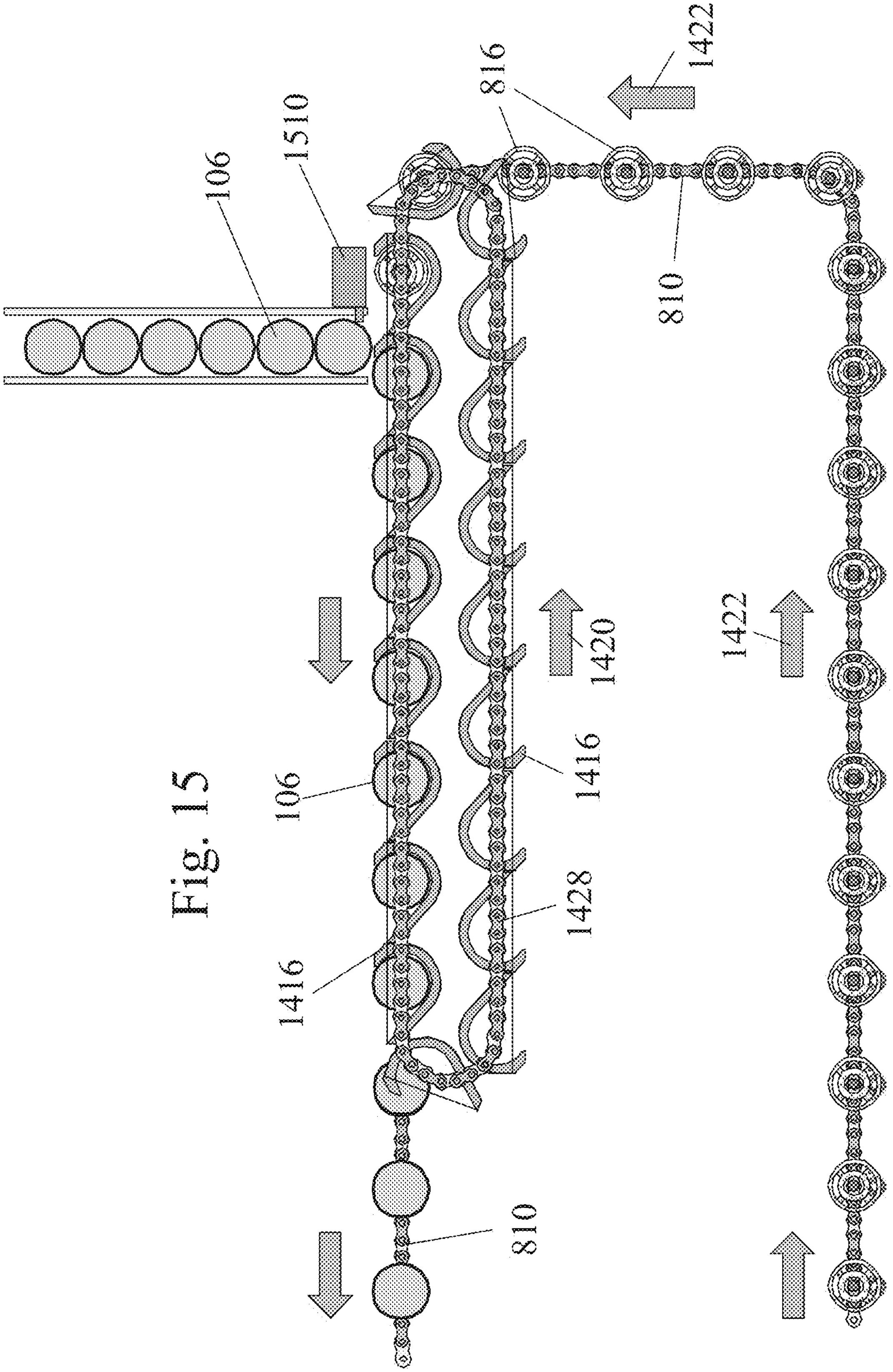
FIG. 15 is a schematic side view of the loading station in FIG. 14.

The way in which objects are loaded onto, and unloaded from, the mandrels will now be explained by reference to FIGS. 14 to 17. A loading station is shown in FIGS. 14 and 15 at which objects 106 are placed from two stacks 1430, 1432 onto the mandrels 816, 818 shown by way of non-limiting examples in FIGS. 11 to 13. As previously described, a drive member 810 in the form of a chain drives the pairs of mandrels 816, 818 in the direction of the arrows 1420 and 1422, the drive member being shown in FIG. 15 but not in FIG. 14. Two further chain conveyors 1428 (also shown in FIG. 15 but not in FIG. 14) are located one on each side of the drive member 810 and run alongside it and at the same speed. The conveyors 1428 carry cradles 1416, 1418 for supporting objects with their axes aligned with the axes of the mandrels 816, 818. As the objects 106 may have different diameters, the shape of the cradles can be varied for each diameter and/or the conveyer can be lowered or heightened with respect to the drive member, ensuring that the longitudinal axis of the object on the cradle is aligned to be co-axial with the shaft of the mandrel. In one embodiment, the path followed by the cradles 1416, 1418 is adjustable, such as by moving the sprockets driving the chain conveyors 1428, or by repositioning a guide along which the links of the chain conveyor 1428 slide. In this way, as the mandrels move through the loading station, a cradle travels alongside each mandrel at the same speed.

As the cradles 1416, 1418 pass under their respective stacks 1430, 1432, objects drop, one at a time, into each cradle aligned with a mandrel. Whether or not an object 106 is allowed to drop out of a stack is determined by an interposer 1510 shown in FIG. 15. If a mandrel is present on the drive member 810, then an object can drop into the cradle aligned with it, whereas if the mandrel has been removed, for example because it synchronizes with a no-print region, then the interposer 1510 prevents an object from dropping out of the stack onto the passing cradle.

The interposer can 1510 be constructed in a variety of ways. In its simplest form, it may operate purely mechanically and take the form of a pivotable shaft having at one end a finger obstructing the descent of objects 106 from a stack and at the other end a sensing lever that rides on the mandrels. If a mandrel is present, then the sensing lever rotates the shaft to displace the finger lying in the path of the falling objects, whereas when no mandrel is present, the finger at the opposite end of the shaft prevents loading of an object onto the associated cradle.

In an alternative embodiment, the interposer may operate electrically and take the form of a solenoid operating a gate at the bottom of each stack. The solenoid may receive signals to close the gate upon detection of the absence of a mandrel by an associated electrical sensor. Alternatively, a pre-programmed digital processor which controls the application of ink images to the ITM may send signals to the interposer 1510 to prevent loading of object at positions that synchronize with no-print regions of the ITM.

Figure 16:
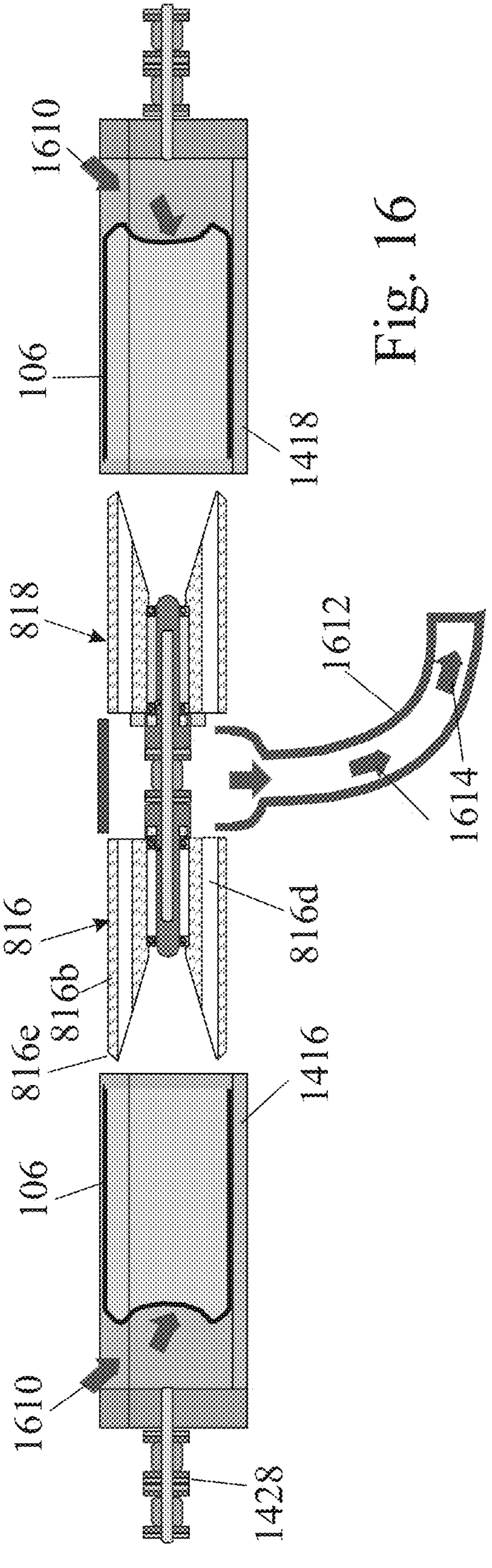
FIG. 16 is a section through two mandrels as they pass through a loading station.

The transfer of objects from the cradles 1416, 1418, to the mandrels 816, 818 can be performed mechanically, most simply by a stationary ramp acting on the closed end of the objects 106. However, in some embodiments shown in FIGS. 16 and 17, the transfer is performed pneumatically. In FIG. 16, at a loading station, air jets represented by arrows 1610, emitted by air knives (not shown) push the objects towards the mandrels 816, 818. At the same time, a suction pump connected to a passage 1612 communicating with the conduits 816*d* within the hollow mandrels 816, 818, draws air in the direction of the arrows 1614 and sucks the objects onto the mandrels. Chamfered ends 816*e* of the outer cylinders 816*b* of the mandrels allow slight misalignment between the axes of the objects and the mandrels to be tolerated. Suction, or mechanical constraint, may continue to be applied to the objects, ensuring that they remain well seated on the mandrels until completion of printing.

Figure 17:
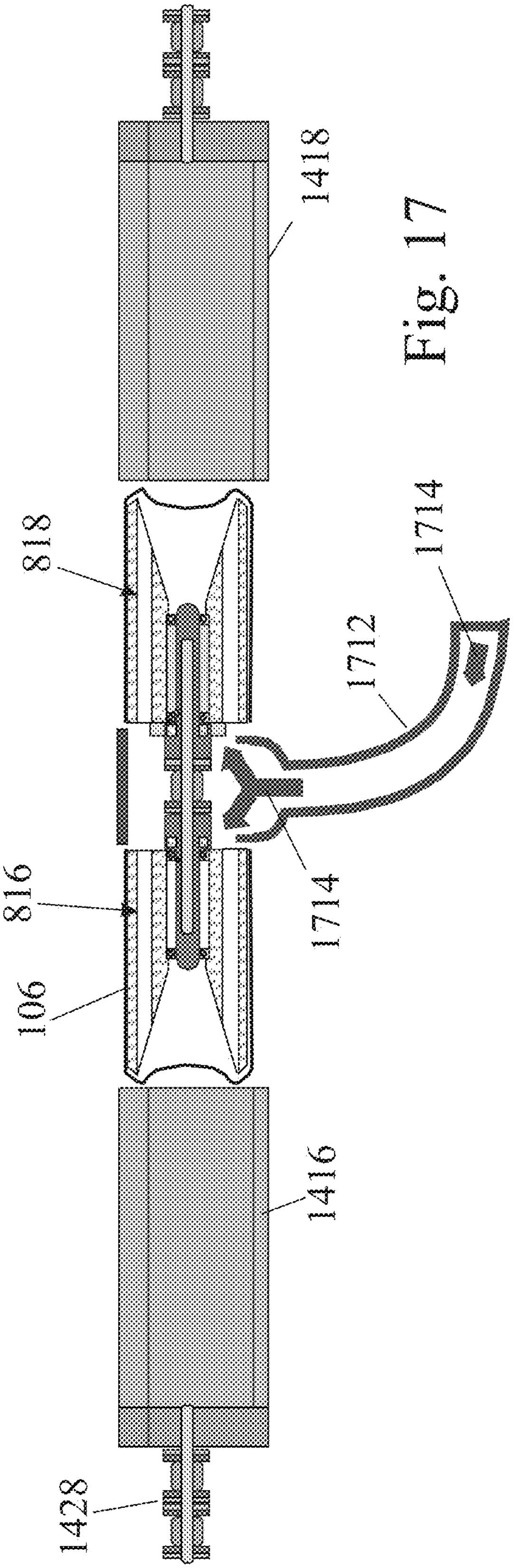
FIG. 17 is similar to FIG. 16 and shows two mandrels as they pass through an unloading station.

To unload the objects from the mandrels, as depicted in FIG. 17, the mandrels 816, 818 are once again aligned with adjacent cradles that are advanced at the same speed and positive pressure represented by the arrows 1714 is applied via a passage 1712 to blow the objects off the mandrels and onto the cradles.

A Printing Apparatus

Figure 18:
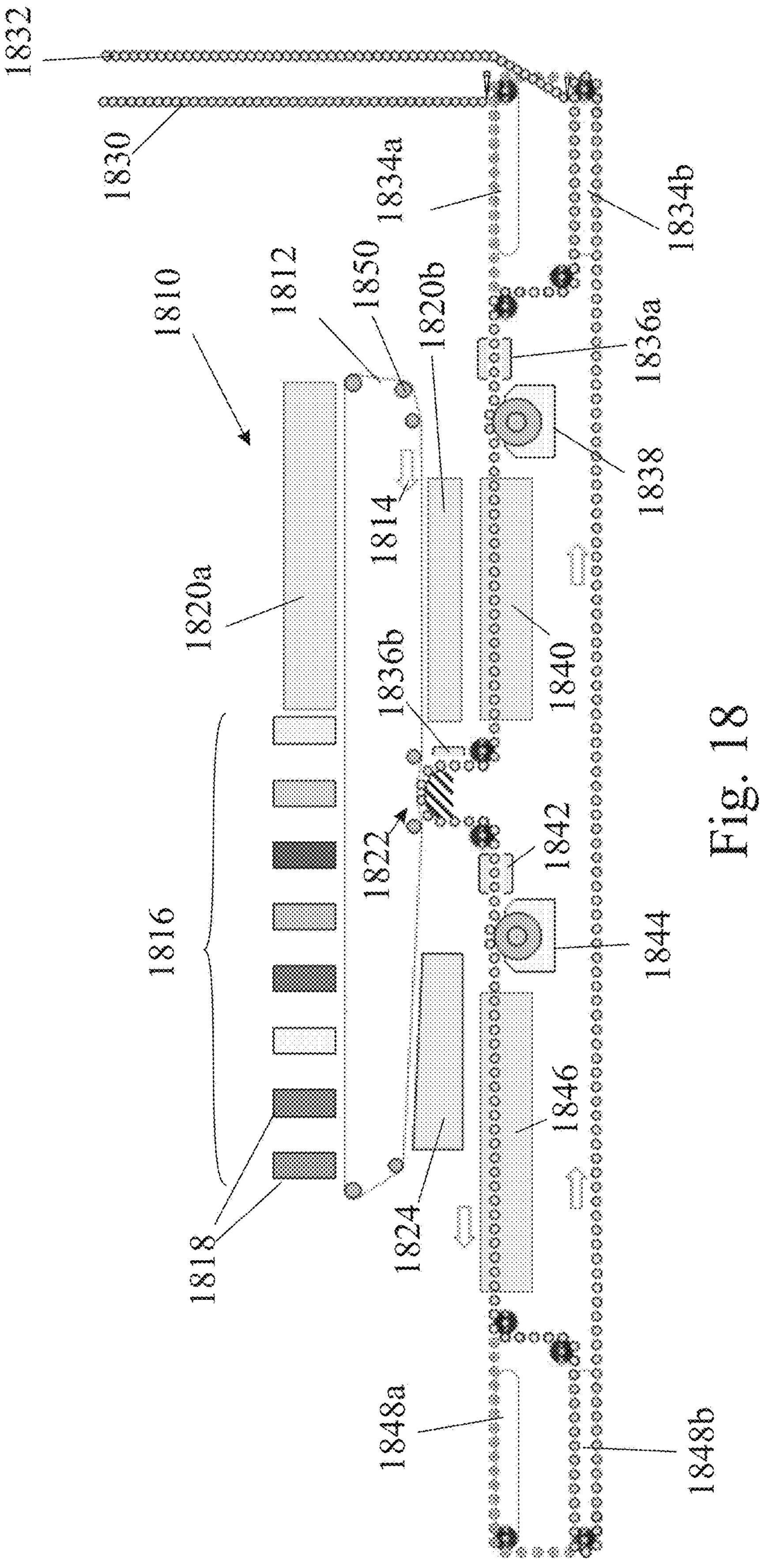
FIG. 18 is a schematic representation of an entire section of a production line at which an ink image can be applied to the surface of generally cylindrical objects using a printing apparatus according to an embodiment of the present invention.

Referring now to FIG. 18, this shows a complete section of a production line in which printing takes place on four columns of objects, arranged in two pairs of columns, the mandrel of each pair of columns sharing a common drive member, as shown in FIG. 11. Printing can be performed by a system 1810 which is described in detail in WO 2013/132418. An ITM 1812 having a hydrophobic outer release surface circulates clockwise, as represented by an arrow 1814. The ITM 1812 first passes beneath an imaging station 1816 having a plurality of print bars 1818 that can deposit aqueous inks of different colors on the ITM 1812. The ITM 1812 then passes through two drying stations 1820*a* and 1820*b* that evaporate the aqueous carrier and leave behind a polymeric tacky ink image. At an impression station 1822, presently illustrated by the type shown in FIG. 7, the ink image is transferred onto the generally cylindrical objects and the ITM 1812 then passes through a cleaning and/or conditioning station 1824 before it returns to the imaging station 1816 to commence a fresh cycle.

The objects on which printing is to take place are supplied in the illustrated embodiment from two pairs of stacks, 1830 and 1832, to two loading stations designated 1834*a* and 1834*b*, each of which is as previously described by reference to FIGS. 14 and 15. As there is not sufficient space for two loading stations to be located side by side, they are arranged in different horizontal planes. The objects are next advanced in rows of four first through an optional pretreatment station 1836*a* where they may, for example, be subjected to a flame, a corona or a plasma. Next, a primer can be applied to the objects at a priming station 1838 and the primer, if applied, is dried in a drying station 1840, after which the objects may be further treated at pretreatment station 1836*b* before entering the impression station 1822.

After an ink image has been impressed on the objects, they may optionally pass again through a pre-treatment station 1842, where the objects may be subjected to a flame, a corona or plasma to prepare them for a varnish coating that can be applied at a varnishing station 1844. After the varnish, if applied, has been dried or otherwise cured such as, for example, by UV exposure or e-beam radiation in drying/curing station 1846, the paths of the two drive members carrying the mandrels once again diverge to take each drive member through a respective one of two unloading stations 1848*a* and 1848*b* at which the objects are sent on to further processing stations of the production line. In a production line for beverage cans, the objects may, for example, be internally coated or subsequently have their shape modified, and they may be filled with a beverage before a cap is secured to them to seal their contents.

Drying station 1840 and 1846 may also serve as heating stations for the mandrels and the objects to ensure that the surfaces of the objects enter the impression station at an elevated temperature which, in some embodiments, may be desirable to help ensure complete image transfer. Such pre-heating of the mandrels may also be accomplished by the addition of heaters or heating ovens at any location in the mandrel path, as, in some embodiments, the heat capacity of the mandrels enables them to heat the objects and maintain their elevated temperature even when not continuously exposed to external heat sources. Though any temperature above room temperature may be desirable, preferred mandrel temperatures may be between 30° C. and 100° C.

It will be seen that in FIG. 18, all the stacks 1830, 1832 have interposers, as previously described, to provide skip feeding mechanisms that prevent loading of objects onto mandrels that have been removed, because they would arrive at the impression station 1822 at times coinciding with no-print regions of the ITM 1812. Regions of the ITM 1812 may be designated as no-print regions, not only because they straddle a seam of the ITM 1812 but also if the ITM has a local defect, or for any other reason.

As has previously been explained, the speed of the ITM 1812 needs to be twice that of drive members of the mandrels. However, minor adjustments may be made to the speed of the ITM 1812 or of the drive members to ensure correct synchronization with the objects. Such adjustments to the synchronization are necessary as each of the ITM 1812 and the drive members has a degree of elasticity which requires slight periodic compensation to ensure that the ink images and the objects meet one another in register at the impression station when transfer is effected.

Furthermore, as has previously been mentioned, it is necessary for the length of the ITM 1812 to be a whole number multiple of the pitch between the objects. Since the ITM 1812 is somewhat elastic, tensioning of the ITM 1812 can be used to make minor adjustments to its length. It is for this reason that the ITM 1812 in FIG. 18 also passes over a tensioning roller 1850.

While the above-described skip-feeding mechanism for three-dimensional objects has been described in the context of a printing system according to the present teachings, wherein ink images are indirectly applied to the outer surface of generally cylindrical objects, this should not be construed as limiting. Moreover, while the presence of a seam on the ITM could be one reason to desire punctually discontinuing the mounting of objects on mandrels, other motives may exist, for instance, avoiding different types of defects on the ITM or on the objects to be printed upon.

Though not shown in FIG. 18, it is desirable that the entire object handling system, including loading stations 1834*a* and 1834*b*, pretreatment stations 1836*a*, 1836*b* and 1842, drying/curing stations 1840 and 1846, unloading stations 1848*a* and 1848*b*, as well as the impression platen and the chain/belt drive member transmission system, be constructed in such a manner that it can slide out from under the printing system and ITM, in a direction orthogonal to the printing process direction, as a single unit for access and maintenance. This can be readily facilitated by floor-supported rollers or tracks.

A skilled person will readily appreciate that the same principles of skip-feeding can be implemented in other printing systems, wherein the objects may have different shapes and/or wherein the ink image may be directly applied (e.g., by ink-jetting suitable ink compositions towards the object outer surface) instead of by contacting an ITM.

Description of Alternative Embodiments

In all the embodiments described above, the objects are directly urged against the ITM at the nip by means of a stationary impression platen in contact with the objects on their opposite side to that in contact with the ITM. However, it is possible to avoid the impression platen coming into contact with the printing surface, if it is instead used to apply a force, via the transport mechanism, to the mandrels. Such embodiment is shown in FIGS. 19 and 20.

Figure 19:
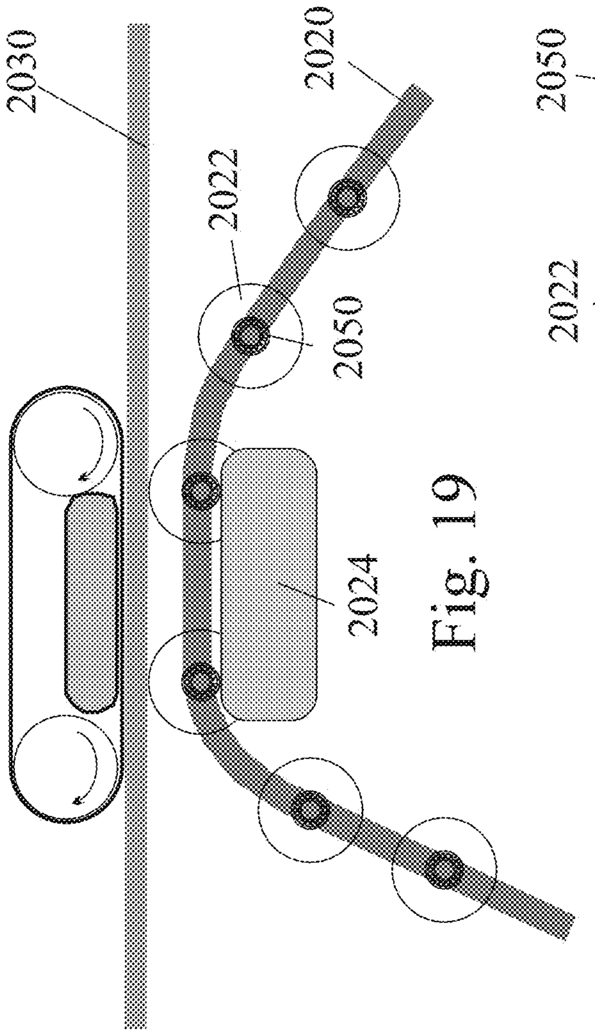
FIG. 19 is a view generally similar to that of FIG. 5 but of an alternative embodiment in which the stationary impression platen acts on the transport mechanism instead of acting directly on the cylindrical objects.
Figure 20:
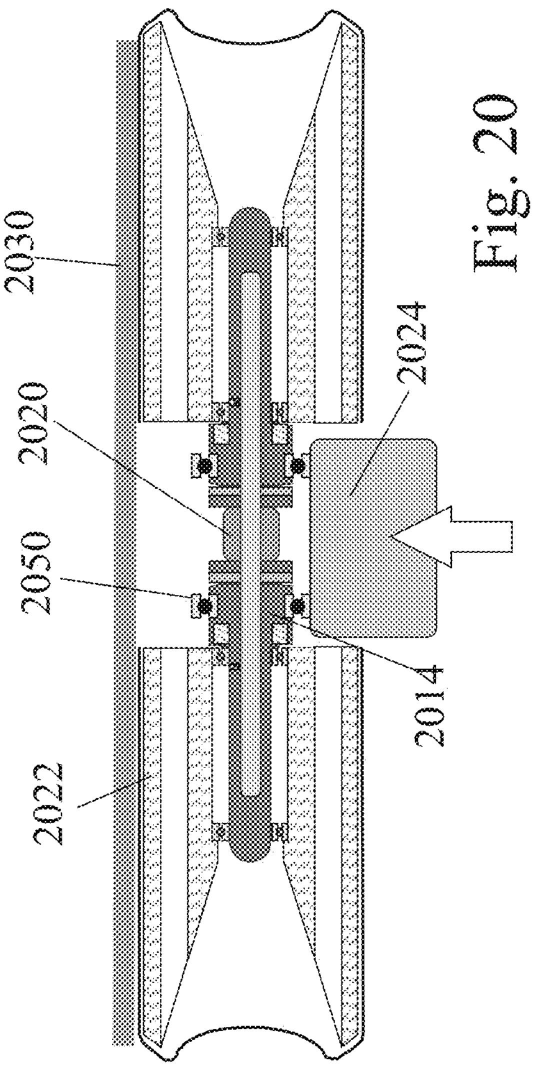
FIG. 20 is a view generally similar to that of FIG. 12 showing the interaction between the transport mechanism and the stationary impression platen in the embodiment of FIG. 19.

FIG. 19 is a variant of the embodiment of FIG. 5 and FIG. 20 is a cross section of a detail of FIG. 19, corresponding to the section shown in FIG. 12. The difference between the two embodiments resides in the fact that bearings 2050, which are shown as ball bearings but may alternatively be friction bearings, are fitted (as shown in FIG. 20) around the hubs 2014 surrounding the shafts on which the mandrels 2022 are mounted. The drive member is illustrated by 2020. The stationary platen 2024 in this embodiment applies a force to the outer races of the bearings 2050, which force is duly transmitted via the mandrels 2022 to the surface of the objects in contact with the ITM 2030. Such a modification of the transport mechanism and the positioning of the impression platen, which enables a force to be applied indirectly to the surface of the objects in contact with the ITM 2030, may also be made to the embodiments described by reference to FIGS. 3, 4, 6, 7 and 8.

Additional Printing Stations

It is understood that in addition to the transport mechanism and the impression station wherein ink images are impressed on the surface of the object using an impression platen as above-mentioned, a printing apparatus as herein disclosed may further comprise inter alia a conditioning station and/or a cleaning station to respectively treat (e.g., by physical or chemical means) and/or clean the intermediate transfer member (such as illustrated by 36 in FIG. 2), a drying station to evaporate liquid carrier out of the ink image (such as illustrated by 34 in FIG. 2), a cleaning station to remove debris from the ITM (not show) and a cooling or a heating station to modify the temperature of the intermediate transfer member along its path (e.g., to facilitate ink image deposition or transfer; not shown).

The printing system may additionally, or alternatively, comprise stations wherein the object is processed. By way of non-limiting examples, the printing system may include a forming station where the object can be formed into a generally cylindrical object optionally including a lid at one end, a shaping station where surfaces of the object can be embossed or otherwise modified to include a functional or decorative pattern; a washing station where the object can be degreased or etched (e.g., ahead of printing), a drying station where a wet object can be dried (ahead of and/or following printing), a priming station where a priming composition or treatment (e.g., corona) can be applied to the outer surface of the object prior to printing (e.g., to further the adherence of the ink image to the object), a heating station or a cooling station to modify the object temperature along its path, a curing station (e.g., to cure an ink image transferred to the object), a coating station (e.g., to coat the transferred ink image with a protective or decorative varnish and/or to coat the interior of the object with a lining) and any other finishing station for further processing the printed objects. Any such station located upstream of the impression region can be termed a pre-processing station and any such station located downstream of the impression region can be termed a post-processing station. Such stations are schematically illustrated in FIG. 2 by stations 15 and 17, respectively.

If desired the printing systems of the present disclosure can be connected in-line with a downstream filling system, wherein the printed objects can be filled with their intended content and lids thereafter attached (e.g., seamed by welding) to the filled bodies to seal the contents. All such stations known in the fields of printing and packaging need not be considered in detail in the present context.

Supplementary Information

The interested reader is referred to the following literature for non-limiting examples further illustrating how to implement the present invention and its various embodiments.

U.S. Pat. No. 5,893,016 describes an apparatus for printing images on generally cylindrical objects such as cans, including an image bearing surface having an image thereon and having an impression guide which is generally parallel to and spaced from the image bearing surface, which guide supports the cylindrical objects in rolling contact with the image bearing surface, whereby images are transferred from the image bearing surface to surfaces of the cylindrical objects in contact therewith. In U.S. Pat. No. 5,893,016, the objects are not supported on mandrels and the apparatus is not therefore well suited to printing on cans before they are filled and sealed. Furthermore, the articles are not advanced by a drive member through the printing station, relying instead first on gravity then on friction with the image bearing surface, and there is nothing to prevent the articles from skewing, prior to or during their passage through the printing station.

Printing sub-systems suitable for the apparatuses according to the present teachings are known to the skilled person and need not be detailed herein. Exemplary sub-systems which may be used, in some embodiments, are further detailed in WO 2017/208145 and WO 2017/208146, wherein, as opposed to the present invention, the objects are mounted on mandrels attached to a rigid support, the ink images being transferred in absence of an impression platen.

Consumables suitable for printing methods and apparatuses according to the present teachings include, in addition to the generally cylindrical objects being printed on, at least one of a) ink compositions, b) intermediate transfer members (e.g., continuous belts with or without a seam), and optionally c) conditioning liquids (e.g., for pre-treating the transfer members ahead of ink application), d) cleaning or washing liquids (e.g., for removing ink residuals from transfer members or degreasing the objects), e) priming liquids (e.g., for pre-coating the objects prior to printing), f) coating liquids (e.g., for applying an overcoat covering the ink image on the printed object), g) lining liquids (e.g., for applying a coat to the interior of the object); and h) like compositions readily appreciated by a person skilled in the art of printing.

Such consumables are selected and adapted to any desired particular configuration and operation of the printing method and apparatus. Moreover, the consumables are compatible with one another. For instance, if, during the printing process, the image bearing surface of the ITM is to be exposed to elevated temperature, it should be heat resistant at least to the applied temperature; if the transfer member is a tensioned belt, it should have mechanical resistance at least to the applied tension; if the transfer member is displaced, it should include, on the side opposite the surface upon which ink is deposited, a layer providing suitable friction or lack thereof with underneath guiding systems; and any such consideration readily appreciated by a person skilled in printing allowing use of the consumable under the operating conditions.

Similarly, from a chemical standpoint, the ink compositions need first to be compatible with the intermediate transfer member and/or with a conditioning liquid (if present). They also need to be adapted to the surface of the object the inks are printed on, and/or to be compatible with a priming compound and/or with a coating compound (if any pre- or post-applied to the object). Fundamentally, a material or a chemical composition is compatible with another if it does not prevent its activity or does not reduce it to an extent that would significantly affect the intended purpose. For instance, the ink compositions would not be compatible if, among other things, they swell the imaging surface of the ITM or otherwise distort its characteristics; if they are unable to at least partially transfer from the image bearing outer surface and/or attach to the surface of the object, whether or not pre-coated; if they are unable to attach an overcoat; if they resist cleaning of the printing system and have any like undesired effect. As readily understood, this principle of chemical compatibility of any consumable used herein with any other consumable should preferably guide the selection of all materials necessary for the compositions to be used in a printing system as disclosed herein.

Consumables suitable for printing methods and apparatuses according to the present teachings are known to the skilled person and need not be detailed herein. Exemplary consumables which may be used, in some embodiments, are further detailed in WO 2013/132418 and WO 2017/208152.

Ink compositions suitable for printing methods and apparatuses according to the present teachings are known to the skilled person and need not be detailed herein. Exemplary ink compositions which may be used, in some embodiments, are further detailed in WO 2013/132339, WO 2015/036812 and WO 2015/036865.

Intermediate transfer members suitable for printing methods and apparatuses according to the present teachings are known to the skilled person and need not be detailed herein. Exemplary transfer members which may be used or prepared, in some embodiments, are further detailed in WO 2013/132432, WO 2013/132438, WO 2017/208144 and WO 2017/208155.

Conditioning liquids suitable for printing methods and apparatuses according to the present teachings are known to the skilled person and need not be detailed herein. Exemplary conditioning liquids which may be used, in some embodiments, are further detailed in WO 2013/132339, WO 2015/036864, WO 2015/036960 and WO 2017/208246.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the present disclosure has been described with respect to various specific embodiments presented herein for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the disclosure and any change which come within their meaning and range of equivalency.

The word "exemplary" is used herein to mean "serving as an example, instance or illustration". Any example, embodiment, case, instance, or figure/illustration of certain feature (s) described as "exemplary" is not necessarily to be construed as preferred or advantageous over other embodiments and/or to exclude the incorporation of one or more features from other embodiments. Furthermore, a feature which is described as preferred or advantageous in some embodiments, may not necessarily be preferred or advantageous in other embodiments.

As used herein, in the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise. At least one of A and B is intended to mean either A or B, and may mean, in some embodiments, A and B.

Unless otherwise stated, the use of the expression "and/or" between the last two members of a list of options for selection indicates that a selection of one or more of the listed options is appropriate and may be made.

As used herein, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" precedes a numerical value, it is intended to indicate +/−15%, or +/−10%, or even only +/−5%, and in some instances the precise value. Furthermore, unless otherwise stated, the terms (e.g., numbers) used in an embodiment of the presently disclosed subject matter, even without such adjectives, should be construed as having tolerances which may depart from the precise meaning of the relevant term but would enable the embodiment or a relevant portion thereof to operate and function as described, and/or as understood by a person skilled in the art.

Positional or motional terms such as "upper", "lower", "right", "left", "bottom", "below", "lowered", "low", "top", "above", "elevated", "high", "vertical", "horizontal", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

To the extent necessary to understand or complete the disclosure of the present invention, all publications, patents, and patent applications mentioned herein, including in particular the applications of the Applicant or the Inventor, are expressly incorporated by reference in their entirety for all purposes as is fully set forth herein. Citation or identification of any reference in this application shall not be construed as an admission that such reference is available as prior art to the disclosure.

Certain marks referenced herein may be common law or registered trademarks of third parties. Use of these marks is by way of example and shall not be construed as descriptive or limit the scope of this disclosure to material associated only with such marks.

The invention claimed is:

1. An apparatus for printing on three-dimensional objects, the apparatus including a printing station and a conveyor for transporting objects through the printing station, wherein the printing station includes a movable imaging surface for bearing an ink image and the conveyor comprises mandrels mounted on one of a turret, a chain and a toothed belt, a loading station at which objects are mounted onto the mandrels prior to passage through the printing station and an unloading station for removing objects from the mandrels after passage through the printing station, wherein during continuous passage of the imaging surface through the printing station, printing is periodically inhibited during no-print periods and a device is provided in the loading station, operative during continuous operation of the conveyor, to prevent loading of objects onto mandrels that will pass through the printing station during the no-print periods.

2. The apparatus as claimed in claim 1, wherein at times when the printing station is operative, the ink image is present on the movable imaging surface during the passage of the imaging surface through the printing station.

3. The apparatus as claimed in claim 2, wherein the three-dimensional objects have a symmetrical cross-section about at least one axis of rotation and the mandrels are rotatably mounted on said turret, chain or toothed belt, the conveyor being configured to cause each object to rotate during passage through the printing station such that, within a nip region of the printing station, the surface of the object makes rolling contact with the imaging surface, thereby causing the ink image on the imaging surface to be transferred and impressed on a surface of each object.

4. The apparatus as claimed in claim 3, wherein an impression platen is provided within the nip region of the printing station on the opposite side of the objects from the imaging surface, the impression platen being configured to apply a force directly or by way of the mandrels, to the objects to ensure rolling contact between the objects and the imaging surface and being stationary at least in a direction of movement of the imaging surface within the nip region.

5. The apparatus as claimed in claim 4, wherein the impression platen is configured to apply a force directly to each object, by making rolling contact with a region of the surface of each object diametrically opposite a line of contact between the object and the imaging surface.

6. The apparatus as claimed in claim 4, wherein the impression platen is configured to contact the conveyor, so as to urge the mandrels supporting the objects towards the imaging surface.

7. The apparatus as claimed in claim 4, wherein the imaging surface is that of an endless intermediate transfer member (ITM) of an offset printing system that further comprises an imaging station for depositing at least one ink on the ITM, and a drying station to dry the ink and leave behind a tacky ink image to be transferred and impressed onto a surface of each object at the nip of the printing station, wherein an opposite surface of the ITM rests on a support surface contoured to match at least a part of the surface of the impression platen upon which rolling contact is made, the support surface being made of, or coated with, a low-friction material.

8. The apparatus as claimed in claim 7, wherein the ITM is advanced through the nip region of the printing station at a speed substantially equal to twice that of the mandrels.

9. The apparatus as claimed in claim 7, wherein the mandrels are regularly mounted in the conveyor, a distance between any two mandrels adjacent one another in a printing direction forming a pitch, and wherein the ITM has a working circumference being a whole number multiple of the pitch of the mandrels.

10. The apparatus as claimed in claim 7, wherein the ITM includes at least one seam which is at least a part of a no-print region of the ITM.

11. The apparatus as claimed in claim 7, wherein the device included in the loading station is a skip-feed mechanism so that no object is loaded onto mandrels entering the nip region synchronously with a no-print region of the ITM.

12. The apparatus as claimed in claim 7, wherein a) the impression platen is concave and the ITM passes in the nip region over a rotating drive or guide roller having a convex support surface; or b) the impression platen is flat and the ITM is guided over a stationary flat support surface; or c) the impression platen is convex and the ITM is guided over a concave support surface, the impression platen being selected in accordance with a shape of the three-dimensional objects.

13. The apparatus as claimed in claim 7, wherein the ITM is wider than the axial length of two objects, printing stations for each of the objects being optionally staggered along the direction of travel of the ITM.

14. The apparatus as claimed in claim 1, wherein the mandrels are mounted on a flexible drive member being one of a toothed belt and a chain formed of links that are pivotably connected to one another.

15. The apparatus as claimed in claim 14, wherein mandrels are disposed symmetrically on opposite sides of the drive member.

16. The apparatus as claimed in claim 15, wherein the drive member is a chain formed of links that are pivotably connected to one another and wherein each mandrel has an axle aligned with a pivot pin connecting two links of the chain.

17. The apparatus as claimed in claim 1, wherein the mandrels are releasably secured to the conveyor and retained therewith by a mechanical detent and/or magnetic attraction.

18. The apparatus as claimed in claim 1, wherein each mandrel includes at least one internal passage for permitting air flow axially along the mandrel, so as to enable objects to be retained on the mandrels by suction, and to be blown off the mandrels pneumatically.

19. The apparatus as claimed in claim 1, wherein a heating station is provided for heating objects, and/or the mandrels, prior to entering the printing station.

20. The apparatus as claimed in claim 1, wherein the mandrels are selected in accordance with a shape of the three-dimensional objects, the mandrels having a form providing for at least two lines of contact with an internal circumference of the three-dimensional objects.

* * * * *